United States Patent
Leppanen

(10) Patent No.: US 9,143,912 B2
(45) Date of Patent: Sep. 22, 2015

(54) METHOD AND APPARATUS FOR SHARING A COMMUNICATION AMONG WIRELESS DEVICES

(71) Applicant: Nokia Corporation, Espoo (FI)

(72) Inventor: Kari Juhani Leppanen, Helsinki (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 13/681,892

(22) Filed: Nov. 20, 2012

(65) Prior Publication Data
US 2013/0143529 A1   Jun. 6, 2013

Related U.S. Application Data

(60) Provisional application No. 61/566,458, filed on Dec. 2, 2011.

(51) Int. Cl.
| | |
|---|---|
| H04M 1/66 | (2006.01) |
| H04M 3/42 | (2006.01) |
| H04W 4/16 | (2009.01) |
| H04W 4/08 | (2009.01) |
| H04W 4/00 | (2009.01) |
| H04W 4/02 | (2009.01) |

(52) U.S. Cl.
CPC ............... *H04W 4/16* (2013.01); *H04W 4/008* (2013.01); *H04W 4/023* (2013.01); *H04W 4/08* (2013.01)

(58) Field of Classification Search
None
See application file for complete search history.

(56) References Cited

U.S. PATENT DOCUMENTS

| | | |
|---|---|---|
| 2002/0072354 A1 | 6/2002 | Kundaje et al. |
| 2003/0073431 A1 | 4/2003 | Dorenbosch |
| 2004/0185839 A1 | 9/2004 | Seligmann et al. |
| 2008/0004002 A1 | 1/2008 | Chin et al. |
| 2008/0032689 A1* | 2/2008 | Kubota et al. ................ 455/425 |
| 2010/0222084 A1* | 9/2010 | Butterfield et al. ........... 455/458 |
| 2011/0261942 A1 | 10/2011 | Gravino et al. |
| 2013/0143535 A1* | 6/2013 | Leppanen et al. ......... 455/414.1 |

FOREIGN PATENT DOCUMENTS

| | | |
|---|---|---|
| EP | 1865699 A1 | 12/2007 |
| EP | 1973319 A1 | 9/2008 |
| WO | 2006108133 A1 | 10/2006 |

OTHER PUBLICATIONS

Notification of Transmittal of The International Search Report and The Written Opinion of the International Searching Authority, or The Declaration; International Search Report; Written Opinion for corresponding International Application No. PCT/FI2012/051021, dated Jan. 30, 2013, pp. 1-11.
European Office Action for related European Application No. 12853027.6-1870 dated Jun. 18, 2015, 6 pages.

* cited by examiner

*Primary Examiner* — Erika A Washington
(74) *Attorney, Agent, or Firm* — Ditthavong & Steiner, P.C.

(57) ABSTRACT

Methods and apparatuses are provided for enabling a communication intended for a device to be automatically conveyed to a group of other devices within proximity of the device. A method may include determining at least one communication directed to at least one device and one or more other devices within a proximity of the at least one device. The method also comprises causing a conveying of the at least one communication to at least one of the one or more other devices based, at least in part, on a determination of a request to receive the at least one communication by the at least one of the one or more other devices.

20 Claims, 17 Drawing Sheets

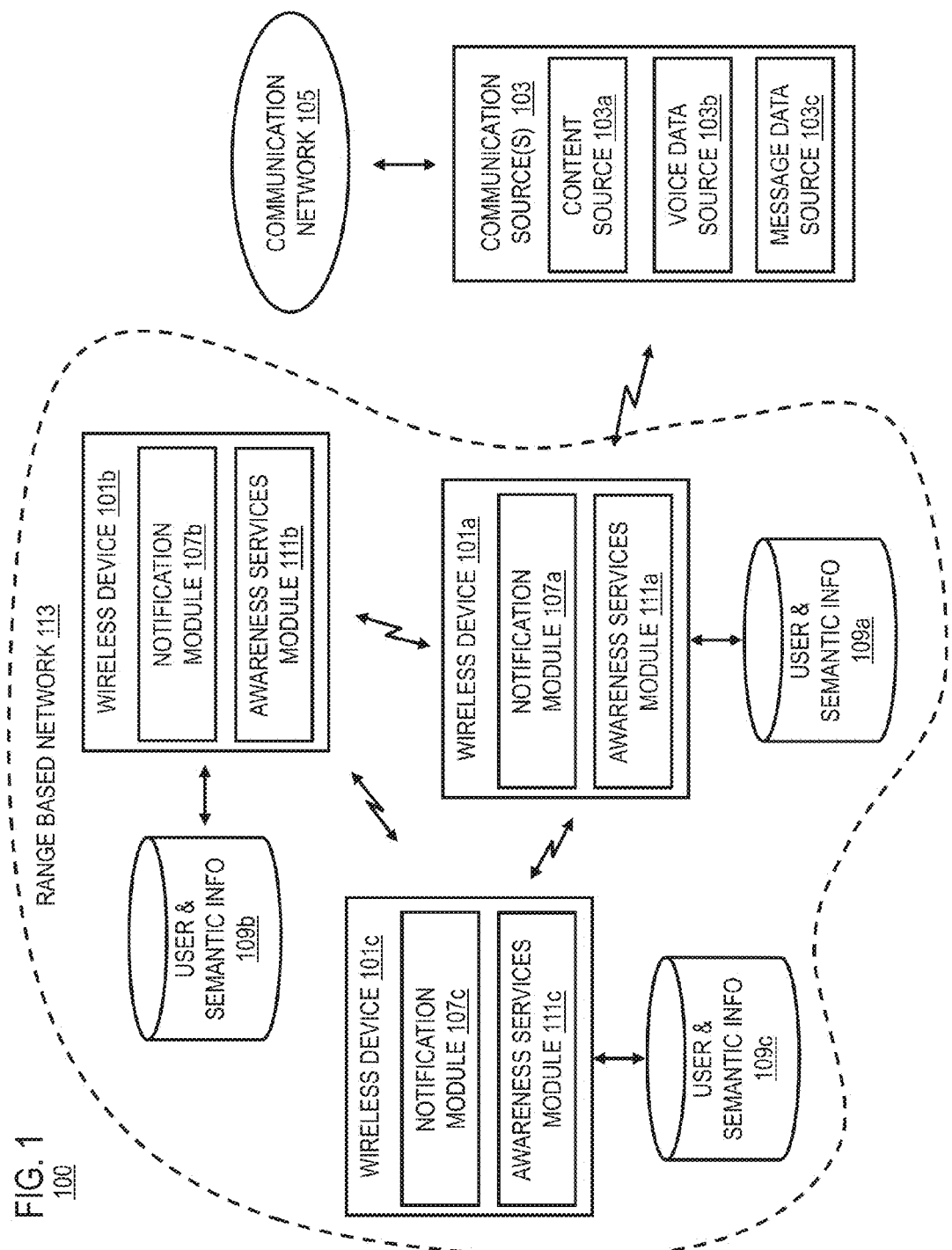

FIG. 2F

| NETWORK LAYER MESSAGE HEADER 281 | | | | | | | |
|---|---|---|---|---|---|---|---|
| TX 282 (TRANSMITTER NID) | SRC 283 (SOURCE NID) | DST 284 (DESTINATION NID) | MSN 285 (MESSAGE SEQUENCE NUMBER) | HOP COUNT 286 | GEOGRAPHICAL LIMIT 287 | TEMPORAL LIMIT 288 | CONTEXT LIMIT 289 |

300

308

312

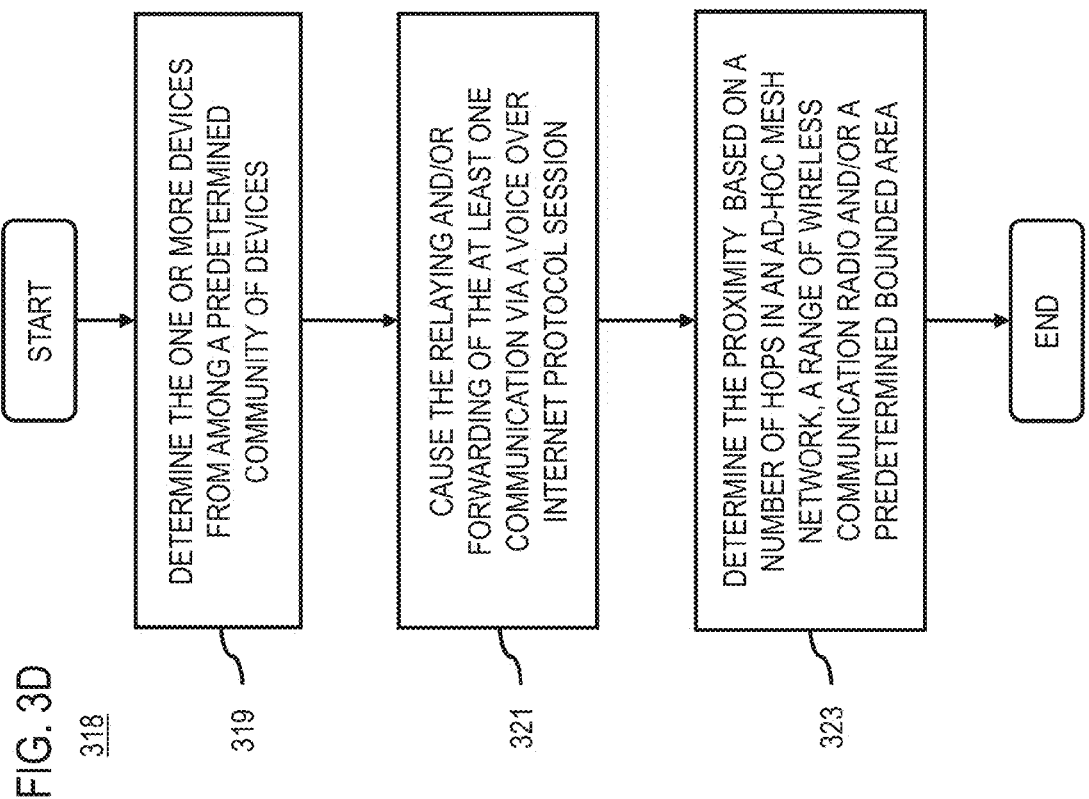

400

400

500

METHOD AND APPARATUS FOR SHARING A COMMUNICATION AMONG WIRELESS DEVICES

BACKGROUND

Service providers (e.g., wireless, cellular, etc.) and device manufacturers are continually challenged to deliver value and convenience to consumers by, for example, providing compelling network services. In particular, these include services for sharing information, content and communications among select users (e.g., group sharing). By way of example, a recipient of a phone call or other communication at their mobile device may wish to have the call, and all future calls, shared with a group of peer mobile device users. Unfortunately, there is currently no solution for enabling a communication intended for one recipient to be automatically shared with a group of other mobile devices via a cellular network.

Some Example Embodiments

Therefore, there is a need for an approach to enabling a communication intended for one recipient to be automatically conveyed to a group of other mobile devices within proximity of the recipient.

According to one embodiment, a method comprises determining at least one communication directed to at least one device. The method also comprises determining one or more other devices within a proximity of the at least one device. The method also comprises causing, at least in part, a transmission of at least one notification of the at least one communication to the one or more devices. The method further comprises causing, at least in part, a relaying, a forwarding, or a combination thereof of the at least one communication from the at least one device to at least one of the one or more other devices based, at least in part, on a determination of a request to receive the at least one communication by the at least one of the one or more other devices.

According to another embodiment, an apparatus comprises at least one processor, and at least one memory including computer program code for one or more computer programs, the at least one memory and the computer program code configured to, with the at least one processor, cause, at least in part, the apparatus to determine at least one communication directed to at least one device. The apparatus is also caused to determine one or more other devices within a proximity of the at least one device. The apparatus is also caused to transmit at least one notification of the at least one communication to the one or more devices. The apparatus is further caused to relay, forward, or a combination thereof the at least one communication from the at least one device to at least one of the one or more other devices based, at least in part, on a determination of a request to receive the at least one communication by the at least one of the one or more other devices.

According to another embodiment, a computer-readable storage medium carries one or more sequences of one or more instructions which, when executed by one or more processors, cause, at least in part, an apparatus to determine at least one communication directed to at least one device. The apparatus is also caused to determine one or more other devices within a proximity of the at least one device. The apparatus is also caused to transmit at least one notification of the at least one communication to the one or more devices. The apparatus is further caused to relay, forward, or a combination thereof the at least one communication from the at least one device to at least one of the one or more other devices based, at least in part, on a determination of a request to receive the at least one communication by the at least one of the one or more other devices.

According to another embodiment, an apparatus comprises means for determining at least one communication directed to at least one device. The apparatus also comprises means for determining one or more other devices within a proximity of the at least one device. The apparatus also comprises means for causing, at least in part, a transmission of at least one notification of the at least one communication to the one or more devices. The apparatus further comprises means for causing, at least in part, a relaying, a forwarding, or a combination thereof of the at least one communication from the at least one device to at least one of the one or more other devices based, at least in part, on a determination of a request to receive the at least one communication by the at least one of the one or more other devices.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of originally filed claims 1-10, 21-30, and 46-48.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 1 is a diagram of a system capable of enabling a communication intended for a device to be automatically conveyed to a group of other devices within proximity of the device, according to one embodiment;

FIG. 2F is a diagram of the data structure of a network layer message header used to implement an embodiment of the invention;

FIGS. 3A-3D are flowcharts of processes for enabling a communication intended for one device to be automatically conveyed to a group of other devices within proximity of the device, according to various embodiments;

DESCRIPTION OF SOME EMBODIMENTS

Figure 2A:
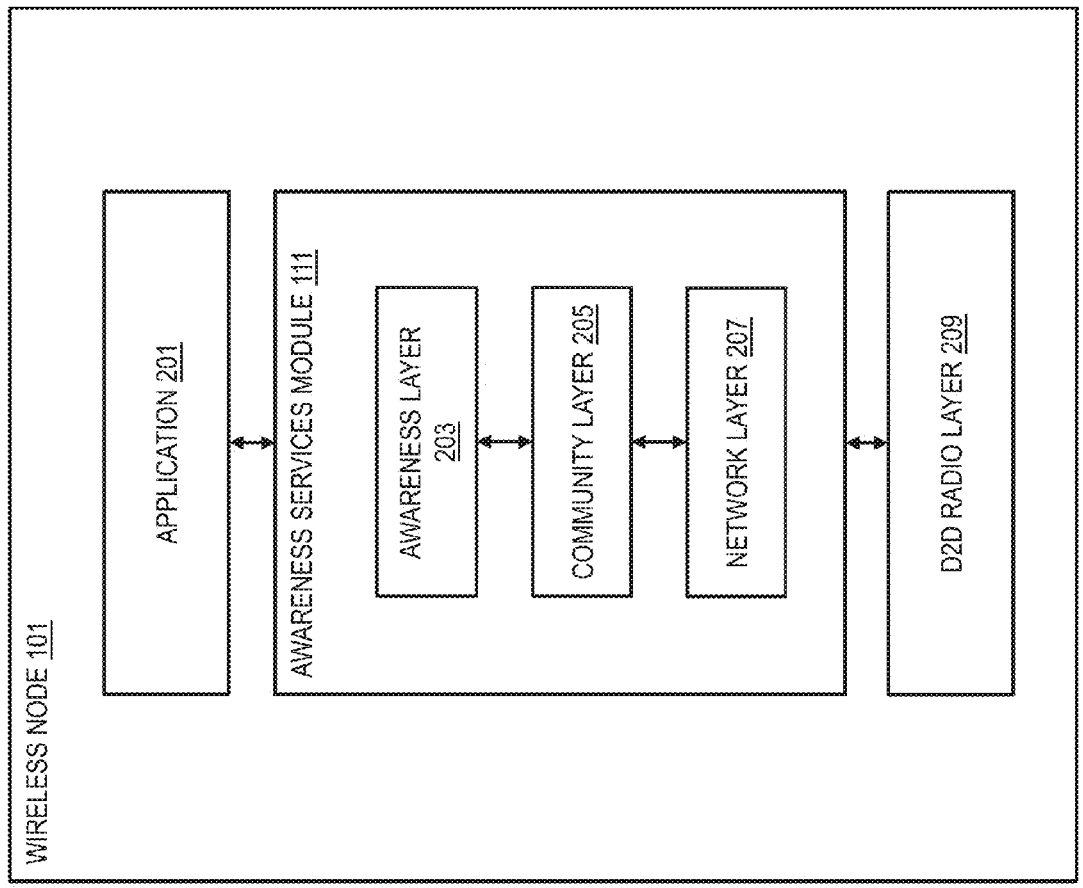
FIG. 2A is a diagram of the components of a device including an awareness services module used to implement an embodiment of the invention.

Examples of a method, apparatus, and computer program for enabling a communication intended for one device to be automatically conveyed to a group of other mobile devices within proximity of the recipient are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Although various embodiments are described with respect to ad-hoc mesh networking, it is contemplated that the approach described herein may be used with other peer-to-peer communication techniques. Furthermore, various communication protocols may be employed in connection with the differing communication techniques including, for example, voice over internet protocol, broadband telephony and the like.

FIG. 1 is a diagram of a system capable of enabling a communication intended for one device to be automatically conveyed to a group of other mobile devices within proximity of the device, according to one embodiment. By way of example, a communication may be directed to a wireless device 101 by a communication source 103 via a communication network 105. In certain embodiments, the communication may be generated, packaged and subsequently transmitted to a wireless device 101 by the communication source 103 as a short messaging service (SMS) message (e.g., text message), phone call, multimedia message, e-mail, or other messaging medium. The communication source 103 may be a landline based telephone, a mobile device, a computer or any other device capable of transmitting messages to a recipient. For the purpose of illustration, the communication source 103 may include one or more of a content source 103a, i.e., a device/host/system for transmitting images, video and other multimedia content related to, or in the form of a communiqué to a recipient; a voice data source 103b, i.e., a device/host/system for transmitting voice and audio signals related to, or in the form of a communiqué to a recipient; and a message data source 103c, i.e., a device/host/system for transmitting text/characters related to, or in the form of a communiqué to a recipient.

Typically, communications are directed to a single recipient by way of a unique identifier. The identifier may be a phone number, email address or messaging handle for referencing a specific device and/or user. By way of example, a communication source 103 in the form of a mobile device can submit a text message to wireless device 101a or initiate a phone call by entering a phone number into a messaging or calling application. The recipient can respond to a call by accepting it (picking up the call) when their wireless device 101a rings. In the case of the text message, the user can review the message once it is received via an "inbox" of their messaging application. In both cases, the user must have direct access to the receiving wireless device 101a in order to accept or respond to the communication.

Unfortunately, the user may not always have access to their wireless device for responding to communications or accepting communication requests. For example, a user of a mobile phone may inadvertently leave the device 101a in a pocket or purse rather than carry it on their person as they interact with family, friends or other associates. Under this scenario, the user is unable to respond to any communications they receive as they are away from, or not paying attention to their phone. The person attempting to communicate with the user, via one or more communication sources 103 would have to wait for a response at a later time. Or alternatively, the person could attempt to contact the phone of one of the associates of the user (e.g., a family member) in an attempt to reach the user by way of proxy/third-party. The former results in delayed receipt and response to the communication, while the latter is tedious for the caller as they may not know which mobile device to contact to reach the user. Furthermore, the recipient of the communication may miss communications requiring immediate attention. Current cellular networks do not support the automated conveyance of communications intended for a specific recipient (e.g., wireless device 101a) to a select group of other wireless devices (e.g., wireless devices 101b and 101c) within proximity of the recipient.

To address this problem, a system 100 of FIG. 1 introduces the capability to configure multiple wireless devices 101a-101c associated with a common group to share a single communication. By way of example, the system 100 enables communications received by any one of the devices 101a-101c of the group to be conveyed—i.e., shared, forwarded, relayed, presented—to/with the remaining devices of the group. Under this scenario, the device performing the conveyance acts as a recipient, while the other devices to which the communication is conveyed serve as remote communication nodes on behalf of the recipient. Hence, any remote communication node within proximity of the recipient may be employed to carry out, fulfill, interact with or respond to the received communication, a communication source 103 for initiating the communication, or a combination thereof.

The devices 101a-101n are any type of mobile terminal, portable terminal, or fixed terminal including mobile handsets, personal computers, stations, units, devices, multimedia tablets, Internet nodes, communicators, Personal Digital Assistants (PDAs), radio readable tags (e.g., near field communication (NFC) tags, radio frequency identification (RFID) tags), or any combination thereof. It is also contemplated that the devices 101a-101n can support any type of interface to the user (such as "wearable" circuitry, etc.). In certain embodiments, only those devices within proximity of the recipient device to which the communication was originally directed (e.g., device 101a) are enabled for conveyance of the communication. Conveyance of a communication may include, for example, the sharing, forwarding, presenting and/or relaying of a message, content, information or a combination thereof a communication initiated/transmitted by a communication source 103. The user of device 101a is able to select a specific group of wireless devices to receive the communication from among a community of devices configured for range based, peer-to-peer networking.

By way of example, the community of devices 101 conveys communications via a range based communication network 113. Range based communication network 113 is established according to one or more networking techniques, including for example, ad-hoc mesh networking, wireless node/radio communication, or the like. Resultantly, the network 113 supports establishment of secure, peer-to-peer communication channels between respective devices 101a-101c comprising the community. As such, data is packaged for transmission via the one or more channels according to various known and still developing protocols, including Voice over Internet Protocol (VoIP), Secure Voice over IP (SVoIP) and other means of transporting data via internet protocol telephony.

The community of devices comprises the collective sum of all devices 101 configured to interact within and/or establish among themselves a range based communication network 113. Hence, it is noted that one or more of the collective devices 101a-101c of the community may be further defined by respective users of said devices 101a-101c as belonging to one or more defined groups. For example, a user of device 101a may associate devices 101b and 101c with a group entitled "My Family" for denoting those devices belonging to family members. Still further, the user may associate device 101c with a group entitled "Judo Club" for denoting those devices belonging to members of a martial arts school the user attends. Under this approach, a communication received by device 101a from a known family member may be selected by the user via the related group designation for conveyance to devices 101b and 101c. Likewise, a call from a martial arts instructor may be selected by the user via the related group designation for conveyance to only device 101c. In this example, the specific identify of the caller may be determined (e.g., via caller identification, message tracking, or the like) for enabling targeted and/or conditional conveyance of the communication.

It is noted that any of the devices 101a-101c within the community, and furthermore within proximity of one another, may serve as remote communication nodes for another device. Hence, conveyance is based on the appropriate group affiliation and/or proximity conditions being met. As such, the remote communication node carries out one or more functions pertinent to facilitating the communication as would the recipient wireless device. This may include, for example, causing activation a ringer or a vibration in response to a conveyed communication. As another example, the remote communication node may be caused to render various images, videos and other data to a screen of the remote communication node in response to a conveyed communication. The actions performed by the remote communication node relative to the communication depend on the capabilities of the devices—i.e., device 101b features a graphical user interface while device 101c does not.

It is further noted that one or more conditions for conveyance of a communication may be established by the user of the recipient device. For example, the user may specify that incoming communications be conveyed to select devices based on certain call characteristics, timing requirements, location information, priority settings, etc. Conditions are determined to be met based on the processing of metadata related to the incoming communication. Thus, a text message conveyed by a messaging data source 103c may include timestamp data, device identifier data, network address information, carrier signal data, user identifier information, and other data for providing contextual, operational and/or environmental details regarding the message. In keeping with the above referenced example, when the user is at the martial arts school practicing, they may opt for all communications to be automatically conveyed to devices belonging to the "Judo Club" group. If users belonging to this group are present when a call arrives, the incoming call signal is automatically conveyed to all members (in proximity) of those groups. Hence, while the specific identity of the caller is not necessarily determined, the group relating to the present environment and/or activity of the user is chosen. Under this scenario, if the user of wireless device 101c (per the "Judo Club" group) is within proximity of wireless device 101a, the communication is directed to both devices 101a and 101c. This increases the likelihood of a pertinent communication being received by the intended recipient, related peers within proximity of the intended recipient, or a combination thereof.

It is noted that the call conveyance options, conditional settings, etc., may be configured prior to receipt of a call. In certain instances, however, the user may not have access to their device in advance. Hence, in certain embodiments, the user can also initiate various call conveyance options and settings upon call receipt (e.g., on the fly). For example, a user that receives a call from a particular caller may decide to share all future calls from the same caller with the "Friends" group from thereon.

In certain embodiments, the proximity of a device to the recipient device at determines the ability of the device 101 to serve as a remote communication node within the range based communication network 113. For example, when device 101c is determined not to be within proximity of recipient device 101a, only device 101b and 101a comprise the community. Likewise, when device 101a receives a communication, it can only be directed to device 101b even though it shares a common group affiliation with device 101c. As a result, subsequent communications intended for the recipient device 101a are limited to being conveyed to device 101b until device 101c is determined to be within proximity again (e.g., the device reconnects with the range based communication network 113). It is noted that the proximity of a device is determined, based at least in part, on a number of hops in an ad-hoc mesh network, a range of wireless communication radio, a predetermined bounded area, or a combination thereof.

Each of the devices 101a-101c is configured with a respective notification module 107a-107c and awareness services module 111a-111c. The modules operate in connection with one another, as well as with various other executions of the mobile devices, to facilitate the above described communication among commonly grouped devices. By way of example, the notification module 107 performs various tasks, including: (1) enabling the selection of groups and/or other wireless devices 101 to convey a communication to based on the proximity of the other wireless devices 101 to a recipient wireless device; (2) establishing one or more conditions for conveyance of a communication based on metadata, context information, user information, etc.; (3) conveying a communication based on the various conditions and/or based on a selected group; and (4) performing authentication of the one or more wireless devices 101 selected to convey and/or receive a communication. In certain embodiments, user and semantic information is maintained by respective devices 101a-101c relative to incoming communications from a communication source 103.

In addition, the notification module 107b is configured to generate as well as receive alerts for informing other devices 101 of incoming communication requests at the recipient device 101a, active communication sessions of the recipient device 101a, or a combination thereof. For example, when recipient device 101a receives a call from a voice data source 103b (e.g., a mobile phone), the notification module 107a generates an alert of the incoming call. It then transmits the alert to the corresponding notification modules 107b and 107c of devices 101b and 101c respectively. Transmission of the alert occurs after it is determined, i.e., by the awareness services module 111a, that the proximity and/or group condition is met. Alerts are sent in the form of a notification message or the like and may feature various controls and/or interactive buttons for receiving response data. In certain embodiments, responses may include acceptance of a communication, rejecting of a communication, etc. The alert generation and response process is described more fully with respect to FIGS. 4A-5C.

In certain embodiments, the awareness services modules 111a-111c of respective devices 101a-101c are configured to generate awareness information regarding the devices within the range based communication network 113. The awareness information is used to determine the presence of one or more wireless devices within proximity of a recipient device in response to receipt of a communication. In addition, the awareness services modules 111 are configured to enable generation and maintenance of a range based network 113 for facilitating peer-to-peer communication.

In the case of ad-hoc mesh networking, connectivity is facilitated by way of connectionless, seamless device sharing. By way of example, the awareness services module 111 metaphorically equips a communication device with "radio eyes and ears" to continuously collect and exchange relevant information and content with other devices within the boundaries of the network 113. The awareness services module 111 facilitates enhanced conveyance of awareness information and/or content, supports peer-to-peer versus client/server computing techniques, maintains the privacy and anonymity of users sharing awareness information and prevents the proliferation of undesired messages (e.g., spam) over the network 113.

In exemplary embodiments, the range based communication network 113 may be formulated by the awareness services modules 111a-111c as an ad-hoc mesh network. The ad-hoc mesh network enables the sharing of awareness information, and is for instance, a connectionless and serverless device-to-device network (e.g., a mobile ad-hoc network (MANET)) created using short-range radio technology (e.g., wireless local area network (WLAN) or Bluetooth®). Within the ad-hoc mesh network, each device 101 may be mobile and is within communication range of any number of other devices 101. Accordingly, the set of devices 101a-101c that is within communication range—i.e., within the bounds of the mesh network—is transient and can change as the devices 101a-101c move from location to location.

Connectionless operation may include, for example, the ability of a node (e.g. device 101a) to send and of all surrounding nodes 101a-101n to receive awareness information without the need to send any prior control signaling. For example, sending awareness information using the transmission control protocol/IP (TCP/IP) over a WLAN ad-hoc is not connectionless because of the two-way TCP control signaling between the sending and receiving nodes used to establish the TCP connection. The awareness information is provided in small anonymous messages that are exchanged by the devices 101a-101n automatically without user intervention. By anonymous it is meant it is not possible to infer the true identity of the sender from the message, unless the true identity is intentionally included in the message (e.g., by the user of the recipient device or another entity authorized by the user). The exchange of awareness information occurs as a broadcast message (i.e., a flooding message) from a device 101a to neighboring devices 101 that are within range of the radio of the broadcasting device 101. As neighboring devices 101 receive the broadcasted message, each receiving device 101 in turn rebroadcasts the message to other neighboring devices 101. In this way, the originally broadcasted message propagates throughout the ad-hoc mesh network (e.g., range based communication network 113). In exemplary embodiments, the extent of the propagation may be limited by criteria such as distance, location, time, etc.

The awareness services module 111 enables devices 101a-101c to access and share content, including communications, with one another readily via the mesh network. In addition, the modules eliminates the problems associated with traditional methods for route establishment and maintenance (e.g., connection based communication protocols), such as maintaining and handing off connections as mobile devices move, and requiring high levels of network resources for maintaining connections in an environment with a high number or density of mobile devices. For example, the event of a device 101 appearing/disappearing to/from the network does not generate any control signaling in the ad-hoc mesh network.

Similarly, the system 100 creates routing information only when needed to route replies to queries back to the querying node—i.e., a recipient device 101a inquiring about the presence of one or more remote communication nodes 101b and 101c. The routing information is generated by using the query messages alone (i.e. no control signaling is used for creating routing information). In other words, the query/reply process of system 100 provisions routes for a reply to provide awareness information on demand rather than pushing awareness information from one node 101 to another. In exemplary embodiments, both push (e.g., information is published over the ad-hoc mesh network) and pull (e.g., information is queried from other nodes 101a-101n of the ad-hoc mesh network) modes of disseminating awareness information are possible. In certain embodiments, it is contemplated that the pull mode of operation can be used instead of the push mode to help suppress potential spam messages.

The awareness services module 111 also operates in connection with the various integrated sensory devices of wireless devices 101. This includes, for example, audio recorders, video recorders, spatiotemporal detection devices, movement detection mechanisms, etc. The sensor devices are able to provide additional contextual, spatial and other practical data regarding each user within the ad-hoc mesh network as engaged in the bounded environment for enabling conveyance of one or more communications. This data is collected by the awareness services module 111 as user and/or semantic information 109 and can be processed by the notification module 107 for determining the presence of devices, performing device authentication, etc. Furthermore, the compilation of such data creates for the user a local semantic web, whereby local awareness information and content are created and searched for automatically by devices 101 within the ad-hoc mesh network.

FIG. 2A is a diagram of the components of the awareness services module, according to an exemplary embodiment. FIG. 2A is described with respect to FIGS. 2B-2E which are diagrams of the components of an awareness services module, according to various exemplary embodiments. As shown in FIG. 2A, a device 101 includes one or more components for sharing awareness information within the ad-hoc mesh network (e.g., range based communication network 113). It is contemplated that the functions of these components may be combined in one or more components or performed by other components of equivalent functionality. In this embodiment, the device 101 includes an application 201 that uses awareness information to provide various services and functions including social networking, location-based services, presence information, context determination, advertising functions, etc. The application 201 may interact with the awareness services module 111 to obtain or share awareness information for facilitating conveyance of communications to one or more wireless nodes within the network 113. By way of example, the application 201 may be implemented as a messaging application, email utility, web conferencing tool, or the like for enabling a communication to be automatically conveyed to a group of remote communication nodes.

Figure 2B:
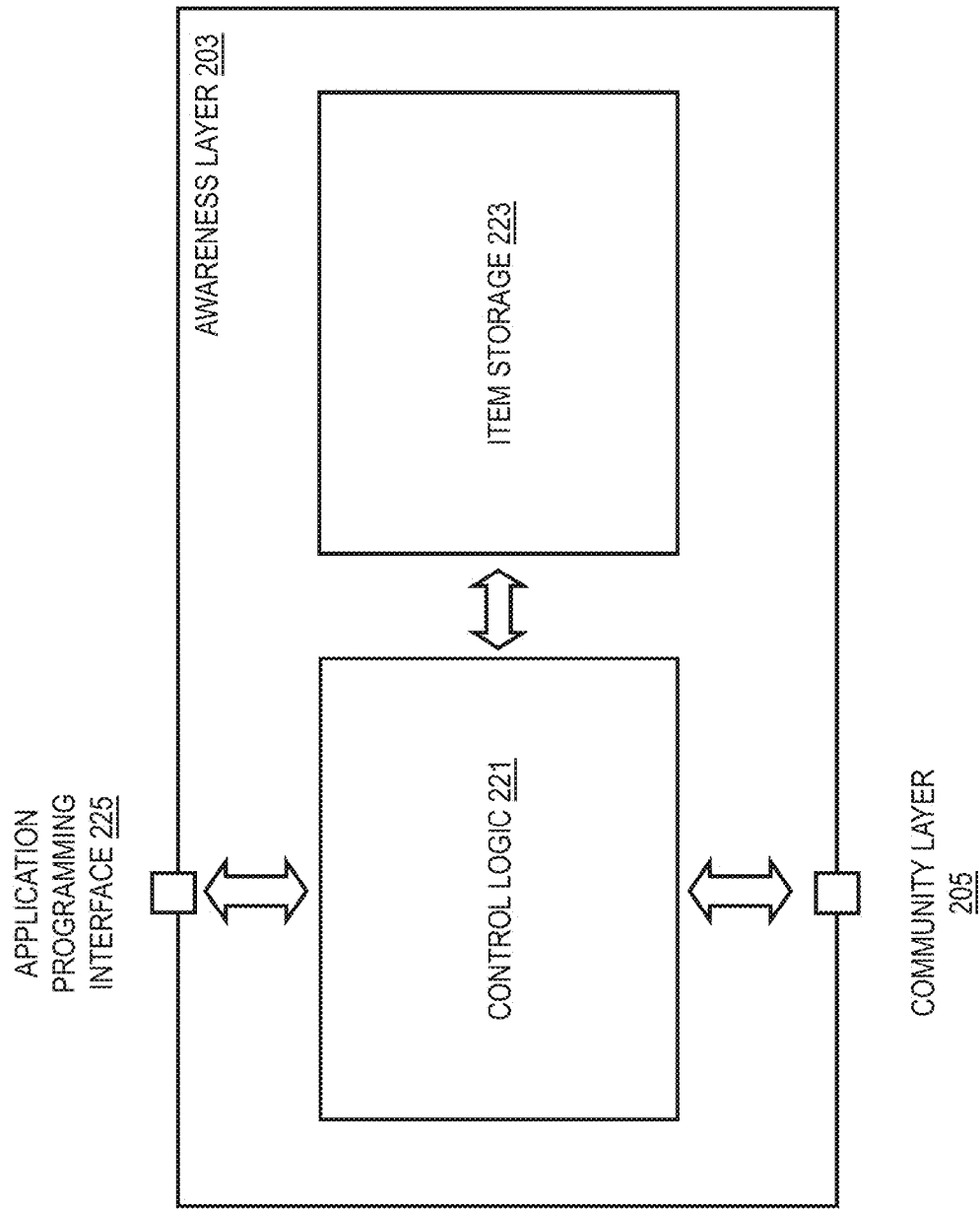
FIGS. 2B-2E are diagrams of the components of an awareness services module used to implement an embodiment of the invention.

The awareness services module 111 includes three layers: an awareness layer 203, a community layer 205, and a network layer 207. The awareness layer 203 is the highest control layer for sharing awareness information. As shown in FIG. 2B, the awareness layer 203 includes a control logic 221 and item storage 223. The control logic 221, for instance, provides the logic for creating, publishing, querying, and receiving awareness information over the ad-hoc mesh network. The control logic 221 can store the information that it either creates or receives in the item storage 223. It is contemplated that the item storage 223 may be of sufficient size to store all or a portion of the information that flows through the device 101 over a configurable period of time (e.g., days, months, or years).

In exemplary embodiments, the control logic 221 enables querying and dissemination of awareness information by initiating the flooding of the query or information to neighboring devices 101 within the ad-hoc mesh network. For example, upon receiving a query, the devices 101 within proximity having queried for information reply to the querying node automatically. In exemplary embodiments, the reply information is also automatically stored in the item storage 223 of each device 101 through which the propagating reply passes. Moreover, the reply to a query may result in return of a pointer to specific content relevant to the query rather than the content itself under certain circumstances (e.g., when the specific content is large in size). It is contemplated that the reply may contain direct content if the content is relatively small (e.g., a few tens of bytes of information). In other instances, however, a pointer to the content minimizes the data traffic that flows through the ad-hoc mesh network. The user may then access the content via the pointer (e.g., a universal resource locator (URL) address, IP address) via a more appropriate communication protocol (e.g., IP) and/or means of communication (e.g. infrastructure networks). The receipt of the pointer (e.g., IP address) may automatically trigger the transfer of the content using, for instance, the communication protocol associated with the pointer—i.e., session initiation protocol, session description protocol. In the case of broadcasting or publishing information, any device 101 through which the published information propagates may store the information in item storage 223 of the device 101. The publishing of information may include the conveyance of a communication, which is published for access by the one or more remote communication nodes acting in connection with the recipient device.

In other exemplary embodiments, awareness information can also be published or conveyed directly by flooding an awareness message. Such a push mode for the dissemination of awareness information can be used to support some applications (e.g. advertising or group chatting) over the ad-hoc mesh network.

It is recognized that privacy and anonymity may be of concern to users of the system 100. Accordingly, the control logic 221 provides mechanisms for ensuring privacy and anonymity. For example, the control logic 221 can prevent the transmission of intimate information when the number of neighboring devices is small to prevent the possibility of inferring identity. As used herein, the term "intimate information" refers to information directly related to the user, e.g., the user's habits, tastes, or preferences (musical preferences, favorite restaurants, etc.). Still further, the control logic 221 may process a key, seed value, unique identifier value, or other data for performing user and/or device authentication. As such, the recipient device and wireless devices to receive a communication are able to validate the source of the communication within the ad-hoc mesh network.

The control logic 221 may also periodically broadcast decoy queries and replies to make tracking an individual device 101 more difficult. Since an outside observer does not know the authentication key associated with a community, the observer cannot distinguish a valid message from a fictitious one. Accordingly, by observing decoy messages, the observer is likely to detect presence of a private community when there is not one. Additionally, the control logic 221 enables to user to define filters for incoming information (e.g., filter advertisements) and how these filters would work (e.g., ignore the information completely, relay the information but do not store, etc.). It is also contemplated that the user can direct the control logic 221 to control the user's visibility on the ad-hoc mesh network (e.g., no visibility, visible only to a certain community or other user) to maintain privacy. As another mechanism for protecting privacy, the control logic 221 can interact with the community layer 205 to anonymize a specific message and corresponding identifiers as described below with respect to the community layer 205.

Because one of the goals of the system 100 is to provide a mechanism for anonymous spreading of awareness information, it is recognized that undesired or unsolicited messages (e.g., spam messages) may become a problem. To address this problem, the control logic 221 may obtain, for instance, information from the lower system layers of the awareness services module 111 about the traffic load and current average power consumption. If the traffic load is medium or high (meaning that also power consumption related to system 100 is medium or high) restrictions may be set for the frequency at which flooding messages are sent by the control logic 221. It is also contemplated, that the neighboring peer nodes 101 can be configured to not forward any flooding messages originating from a node 101 neglecting such message restrictions.

The awareness layer 203, together with the community layer 205, provide an application programming interface (API) 225 to enable an application 201 to access the functions of the control logic 221 and the item storage 223. In exemplary embodiments, the API 225 enables application developers to have uniform and easy access to functions related to sharing awareness information over the ad-hoc mesh network. It is contemplated that the API 225 is extensible to accommodate any application designed to access or use awareness information. The applications in the various nodes 101 do not have to be the same or mutually compatible. It is sufficient that the applications use the API correctly to be able to publish and search awareness information in the surrounding nodes 101.

The awareness layer 203 also has connectivity to the community layer 205. The community layer 205 controls the formation and cataloging of communities of devices 101 within the ad-hoc mesh network. By way of example, a user may create any number of communities for sharing awareness information. It is contemplated that a community may be either a peer community (e.g., any device 101 may join), a personal community (e.g., a device 101 may join only if invited), or the open local community that consists of all nodes in the local neighborhood. In exemplary embodiments, the messages that traverse between the devices 101 within the ad-hoc mesh network belong to one of these three community types. Communities can either be private (messages are encrypted) or public (no encryption used).

Figure 2C:
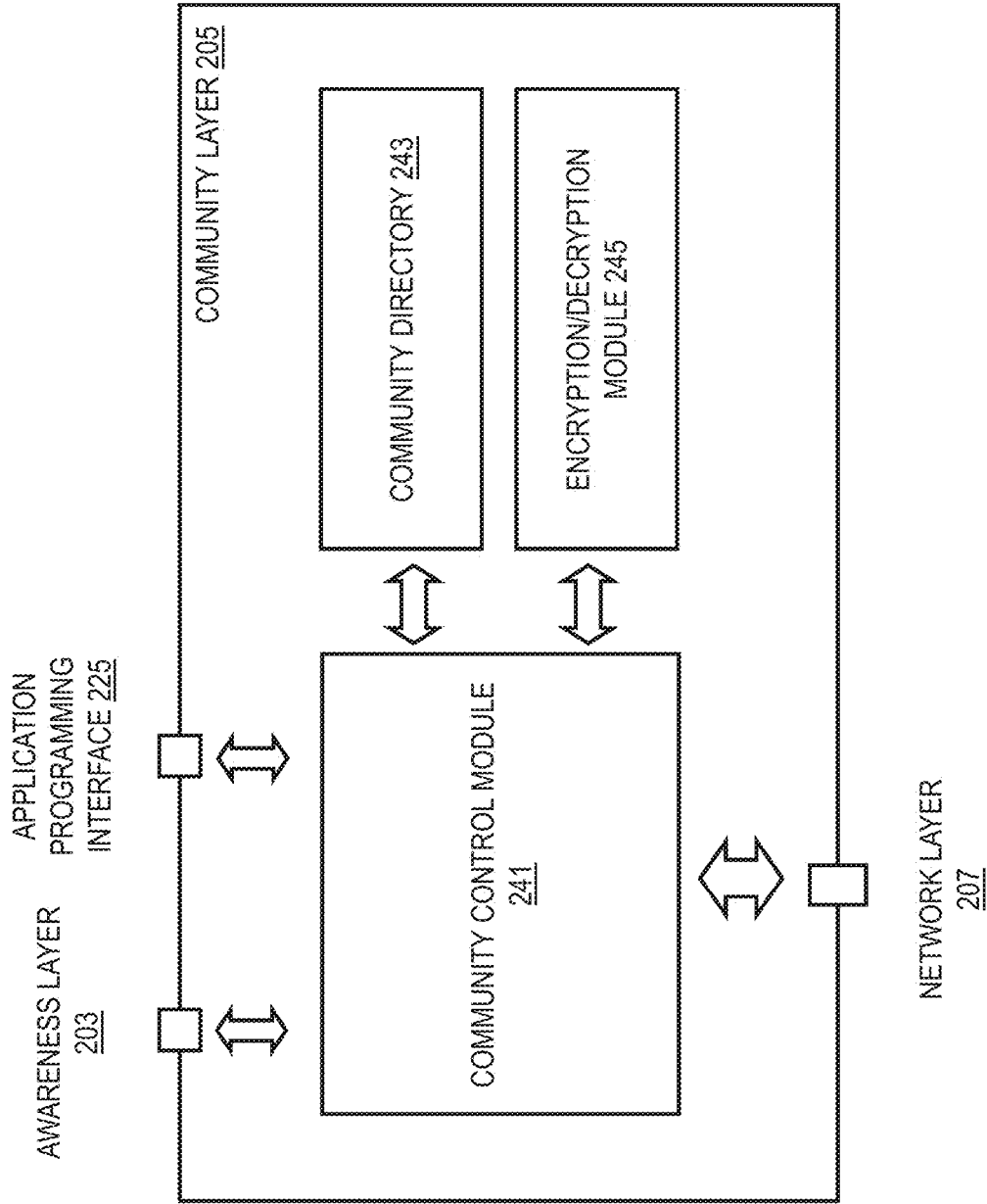

Furthermore, a community may be created for any purpose or duration (e.g., a permanent work community, a permanent community of friends, a temporary community of concert goers lasting only the duration of the concert, etc.). As shown in FIG. 2C, the community layer 205 includes a community control module 241, a community directory 243, and an encryption/decryption module 245. The community control module 241 provides the logic for creating, joining, managing (e.g., updating membership, configuring settings and preferences, setting privacy policies), and deleting communities. The module 241 also provides part of the API 225.

In exemplary embodiments, the community control module 241 assigns a unique community identification number (CID) to each community for use within the ad-hoc mesh network. The control module 241 can also generate authentication keys K associated with the CID to, for instance, authenticate users who wish to join the community or authenticate messages directed to the community. For example, a device 101 may invite another device 101 to join a community by transferring the CID and authentication keys associated with the community to the other device 101. It is contemplated that the transfer of the CID and corresponding authentication key may occur using short range radio or using another secure mechanism (e.g., short message service (SMS) or electronic mail). It is noted that both peer and personal communities use a CID and corresponding K, whereas the open local community either can use a predetermined value for CID (e.g., zero) or does not use the CID at all.

To ensure privacy (as discussed above), the community control module 241 interacts an encryption/decryption module 245 to anonymize the CID when including the CID in messages over the ad-hoc mesh network. For example, a device 101 may direct a query to a specific community using an anonymized CID (e.g., a pseudonym) associated with the community in lieu of the actual CID. In exemplary embodiments, multiple anonymized CIDs may be used to represent a single community. In this way, it is more difficult to identify queries corresponding to a particular community by monitoring traffic within the ad-hoc mesh network. From the perspective of an outside observer, the anonymized CIDs look random. In addition, the encryption/decryption module 245 may encrypt or decrypt message data using, for instance, a temporary key that is periodically derived from the authentication key K associated with the CID. These measures hinder the discovery of the CID by outsiders that do not have the authentication key. By way of example, the community layer 205 inserts a special header into the messages that it receives from the awareness layer 203. The special header, for instance, contains a list of anonymized community identifiers corresponding to the communities to which the message is relevant.

Figure 2D:
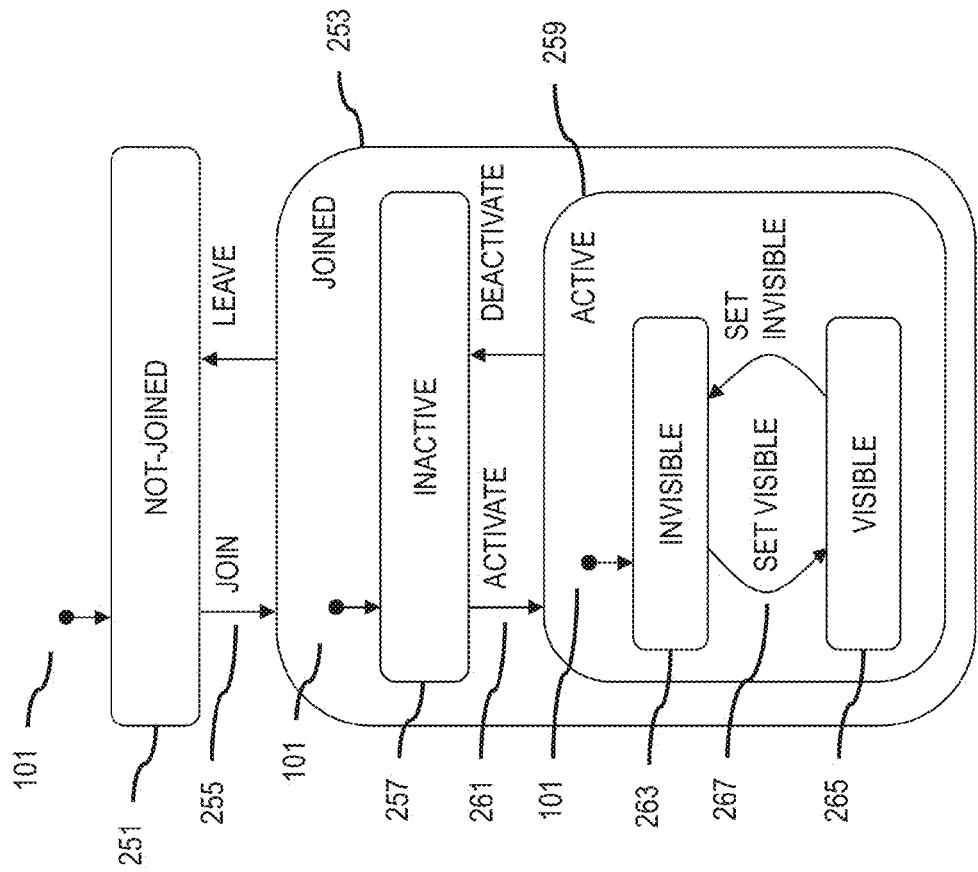

FIG. 2D is a state diagram of the effect of community membership and status on sharing awareness information, according to an exemplary embodiment. As shown in FIG. 2D, a device 101 may be in either one or two states (e.g., a not-joined state 251 and a joined state 253) with respect to membership in a community within the ad-hoc mesh network. The application 201 of device 101 issues, for instance, a command 255 to either join or leave a community to transition between the not-joined state 251 and the joined state 253. When the device 101 is in the not-joined state 251 with respect to a community, the device 101 has no information (e.g., CID and associated authentication keys K) about the community and cannot access messages directed to the community. When the device 101 is in the joined state 253, the community layer 205 receives the CID and possibly one or more authentication keys associated with the community. In one embodiment, authentication keys are provided when membership in the community is by invitation or otherwise restricted (e.g., when the community is a personal community or a private community). Accordingly, the community layer 205 will be able to encrypt outgoing community specific messages and to decrypt incoming community specific messages.

When the device 101 is in the joined state 253, the device 101 may also be in either an inactive state 257 or an active state 259. To transition between the inactive state 257 and the active state 259, the application 201 may issue a command 261 to either activate or deactivate the joined state 253 via the application programming interface 225. When the device 101 is in the inactive state 257, the community layer 205 abandons the message even though it is a member of the community. In certain embodiments, the device 101 may also be invisible to other members of the community while in the inactive state 257. For example, the device 101 may enter the inactive state 257 when it temporarily does not want to receive or share information with the community. When the device 101 is in the active state 259, the community layer 205 encrypts and decrypts community messages as usual for private communities, and enables all outgoing and incoming community specific messages for public communities (e.g., communities with no restrictions on membership).

Within the active state 259, the device 101 may also be in either an invisible state 263 or a visible state 265. To transition between the invisible state 263 and the visible state 265, the application 201 issues a command 267 to set either the visible or invisible state. When in the invisible state 263, the community-specific identity (e.g., a user alias) associated with the device 101 cannot be queried by other members of the community. For example, in the invisible state 263, the community layer 205 continues to receive and send community messages without its identity known to other community members. When in the visible state 265, the identity of the device 101 can be queried by other members of the community.

In various embodiments, the community directory 243 of the community layer 205 maintains, for instance, information on the communities that the user has joined. Such information contains, at least, the community identification (CID). Additionally, it may contain public and/or private authentication keys (K) of the joined communities and a list of anonymized community identifiers for each community. The community control module 241 may periodically recalculate the list of anonymized CIDs. By way of example, the community layer 205 inserts a header into the message it receives from the awareness layer 203. The header contains, for instance, a list of anonymized community identifiers identifying the communities to which the message is relevant.

It is contemplated that a special personal community can be reserved for tracking new bonds or relationships created between users. Consider, for example, that user A meets user B for the first time and wants to create a radio bond between the mobile devices corresponding to each user. In one embodiment, user A can initiate the creation this bond with user B by transferring to user B (e.g., by using a secure transfer mechanism) the CID and the public K of user A's personal "new bonds" community. Similarly, user B may give user A similar credentials corresponding to user B's "new bonds" community. Once the credentials are exchanged and the bond has been created, user A may find user B over the ad-hoc mesh network by searching for members of user A's "new bonds" community. In other words, with a simple search of a single community, user A can search for all the people in user A's local neighborhood with whom she has created a bond. This requires that a high number of community CIDs and Ks can be stored in the community directory 243. Also, an effective lookup of the community directory must be provided. There are many existing and good solutions for such efficient lookup.

As the user creates new bonds, the number community CIDs and Ks stored in the user's community directory 243 can grow quite large. Accordingly, to enable effective search of a large number of communities, the community layer 205 may generate a special community search message to initiate the search. For example, the special community search message contains, at least in part, a list of anonymized community identifiers corresponding to the communities to be searched. To protect the privacy, the community layer 205 can generate a new set of anonymized community identifiers for each community search message. If the community layer 205 finds a match to any of the anonymized community identifiers in any of the neighboring nodes 101 that receives the search message, the community layer 205 generates a reply message that may contain the alias of the user in that community or other community specific information. The reply message may be encrypted with the encryption key of the community.

Figure 2E:
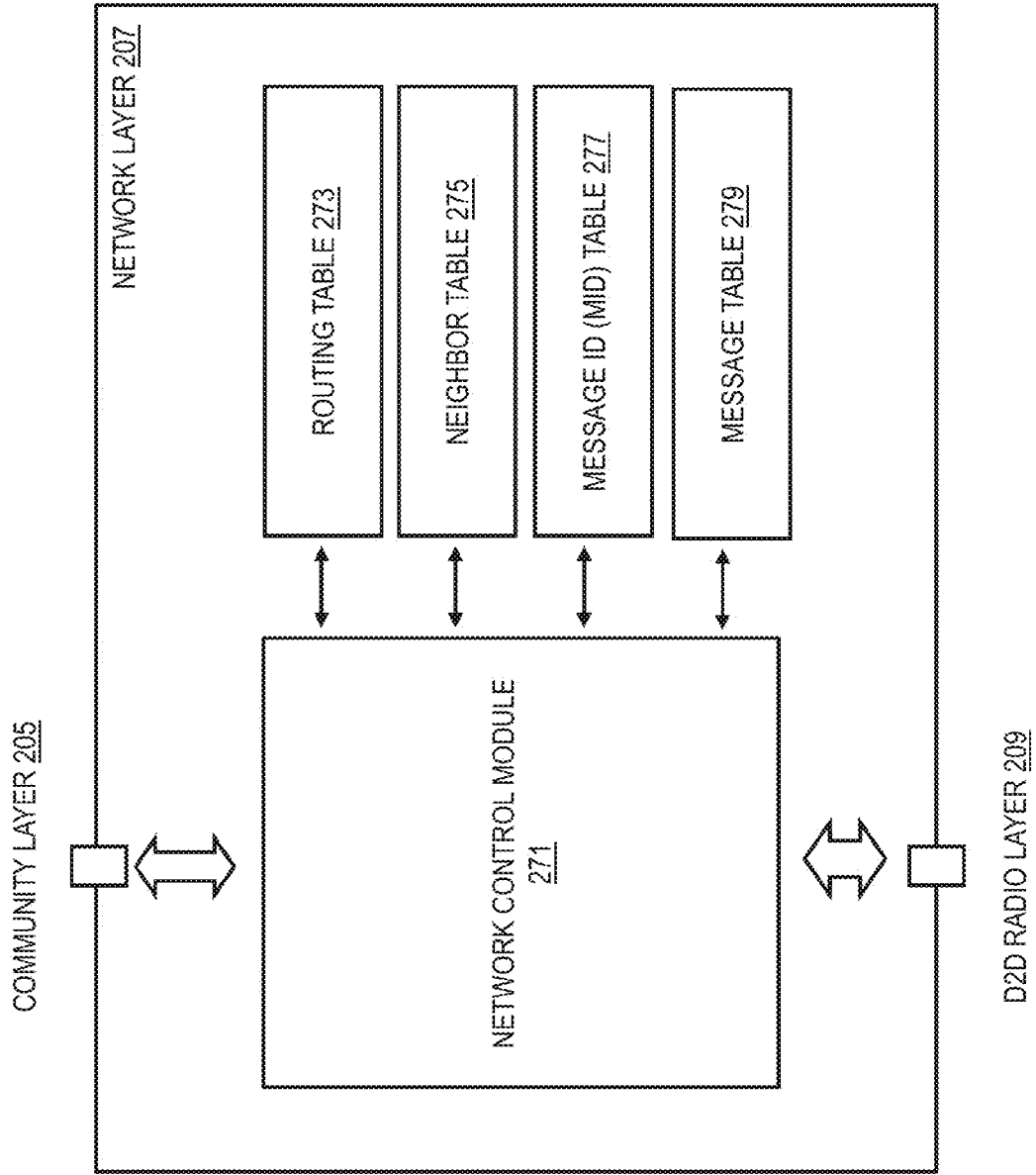
Figure 3A:
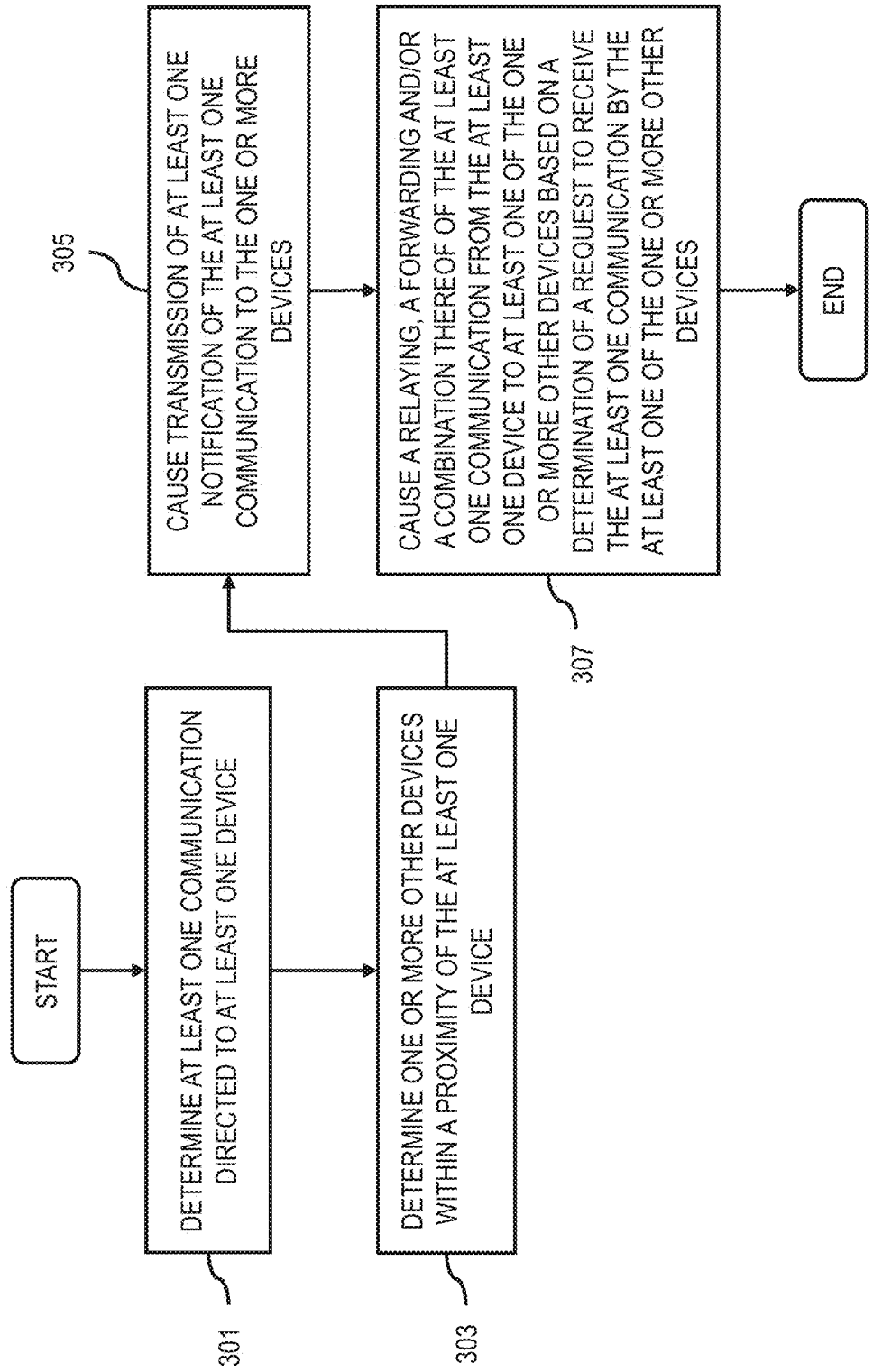
Figures 3B, 3C:
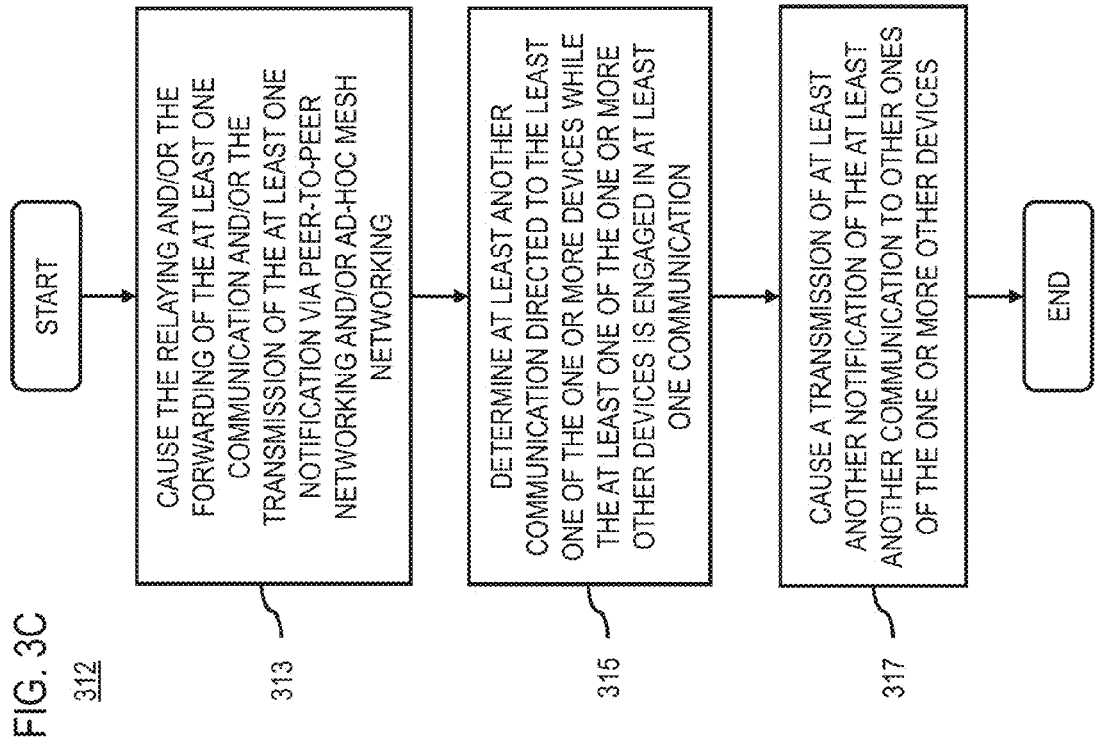

As shown in FIG. 2C, the community layer 205 has connectivity to the awareness layer 203 above and the network layer 207 below. The network layer 207 manages the rebroadcasting of received flooding messages and the routing of the unicast (typically reply) messages received by the device 101. FIG. 2E depicts a diagram of the components of the network layer 207, according to an exemplary embodiment. The network layer 207 includes a network control module 271, routing table 273, neighbor table 275, message identification (MID) table 277, and message table 279. The network control module 271 directs the broadcasts of messages and information by managing and updating the routing table 273, neighbor table 275, MID table 277, and message table 279. In certain embodiments, the network control module 271 may also assist in protecting the privacy and anonymity of users by periodically changing the network layer identification associated with the device 101. It is noted that making such a change in the network layer identification between queries does not cause routing problems for replies because the routing information is recreated by each query in the ad-hoc mesh network.

In exemplary embodiments, the network layer 207 may insert a header into messages it receives from the community layer 205 to, for instance, direct flooding and routing of the received messages. The structure of this network layer message header 281 is discussed with respect to FIG. 2F. FIG. 2F is a diagram of the data structure of a network layer message header, according to an exemplary embodiment. As shown, the message header 281 contains the following fields: (1) a TX field 282 to identify the transmitter node ID (NID) of the last transmitting node 101; (2) a SRC field 283 to identify the source node ID of the node 101 that originated the message; (3) a DST field 284 to identify the destination source ID of the intended recipient of a unicast (reply) message (e.g., this field is give a value of zero when the message is a flooding messages); (4) a MSN field 285 to identify the message sequence number assigned by the source node; and (5) a hop count field 286 that is incremented by one by each node 101 that transmits the message. In certain embodiments, the message header 281 may also contain the following optional fields: (6) a geographical limit field 287 to designate the extent of the physical over which the message is intended to propagate (e.g., the geographical limit field 287 may contain a geographical position of the source node and a maximum flooding radius from that position); (7) a temporal limit field 288 (e.g., the temporal limit field 288 may contain the time when the message becomes obsolete and should be dropped); and (8) a context limit field 289 that defines the context beyond which the message is not intended to propagate (e.g. a message related to a particular concert is not intended to extend beyond the concert venue).

Returning to FIG. 2E, the network layer 207 also contains a routing table 273. In exemplary embodiments, the routing table 273 contains a listing of the node identification number (NID) of the originating device 101 (e.g., source NID) and the NIDs of the last known transmitters of the message. The purpose of the routing table is to enable the routing of the reply messages (e.g., unicast messages) back to the querying node that originated the query through a flooding message. As the message propagates through the ad-hoc mesh network, each subsequent device 101 that receives the message adds the NID of the last transmitter to the routing table to record the next hop neighbor towards the source node. The source node is marked as the destination node (DST) in the routing table. Also the message sequence number of the message is recorded. The update of the routing table 273 is coordinated by the network control module 271. As shown in Table 1, the routing table 273 lists the destination NID, the transmitter NIDs associated with devices 101 that have rebroadcasted a message and the MSN of the message.

TABLE 1

| Destination NID | Transmitter NIDs | Message Sequence Number |
|---|---|---|
| DST1 | TX11, TX12, . . . , TX1M | MSN1 |
| DST2 | TX21, TX22, . . . , TX2N | MSN2 |
| . . . | . . . | |
| DSTS | TXS1, TXS, . . . , TXST | MSNS |

The neighbor table 275 contains a list of the neighboring devices 101 and an estimate of their relative radio distance (see Table 3). It is contemplated that the observed signal strength together with the known transmitting power of a neighboring device 101 is an indicator of the proximity of the device 101 and can be used to calculate the relative radio distance. The relative radio distance of the node from which the message was last received is then used as a criterion for whether or not the device 101 retransmits a received message. For instance, higher signal strength indicates closer proximity to the device 101. The network control module 271 monitors the signal strengths of neighboring nodes 101 as the module 271 receives messages from nearby devices and uses it to estimate the relative radio distance (e.g., proximity of the transmitting node 101). It is also contemplated that the network control module 271 may use any other mechanism for estimating the relative radio distance of neighboring nodes (e.g., estimating location using global positioning satellite receivers or other positioning techniques).

In certain embodiments, the network control module 271 uses the proximity information to direct the routing and transmission of messages over the ad-hoc mesh network. For example, the system 101 can reduce the potential for overloading the ad-hoc mesh network by implementing a smart flooding scheme whereby only a few nodes 101 retransmit a flooding message. Whether a node 101 retransmits a flooding message can be dependent on the relative distance group (e.g., "very near", "near", or "far") to which the node 101 that is the transmitter of the message belongs. More specifically, if the transmitting node 101 is in the "far" or "near" group, the receiving node 101 can retransmit the flooding message. If the transmitting node 101 is in the "very near" group, the receiving node 101 does not retransmit the flooding message. For each broadcast message received from a node in either the "far" or "near" group, the network control module 271 assigns a random delay time for relaying or rebroadcasting. The delay period, for instance, exhibits a distribution function based on the estimated relative radio distance as a way to randomize the delay period before transmission. The distribution should be chosen in such a way that the random delay is larger for those nodes that are "near" than for those that are "far." This favors, for instance, nodes 101 that are further away to relay the flooding message forward, which results in better flooding efficiency (smaller total number of transmissions). The use of a random delay time also prevents the unintended synchronization of message broadcasts as the message propagates over the ad-hoc mesh network. For example, unintended synchronization of the message broadcasts may result in too many nodes 101 sending broadcasting (i.e., flooding) messages over the ad-hoc mesh network at exactly the same time. Additionally, the delay time provides an opportunity for the network control module 271 to monitor and count rebroadcasts of the message by other neighboring devices 101.

TABLE 2

| Transmitter NID | Relative Radio Distance |
| --- | --- |
| TX1 | D1 |
| TX2 | D2 |
| ... | ... |
| TXT | DT |

The MID table 277 contains a list of received messages. As the device 101 receives messages (e.g., communications) from neighboring nodes over the ad-hoc mesh network, the network control module 271 uses the MID table to check whether the message has been received previously by, for example, comparing the MIDs in the MID table 277 to that of the received message. The MID table 277 also contains a flag indicating whether a message has been transmitted by the node 101 and the time when the entry was last updated. In exemplary embodiments, the MID is the tuple (SRC, MSN), where SRC is the NID of the source node and MSN is a message sequence number assigned by the source node. In this way, the MID is a unique identifier of each message that propagates in the network. The network control module 271 makes an entry in the MID table 277 for all new messages that it receives. If the message has been scheduled for transmission, the module 271 increments the message counter in the message table (see Table 4).

TABLE 3

| MID | Sent flag | Time of reception |
| --- | --- | --- |
| (SRC1, MSN11) | "SENT" | t11 |
| (SRC1, MSN12) | "NOT SENT" | t12 |
| ... | ... | ... |
| (SRC2, MSN21) | "NOT SENT" | t21 |

The message table 279 contains messages that the network control module 271 has scheduled to transmit. For example, as the node 101 receives a flooding message that the network control module 271 schedules for transmission, the module 271 updates the message table to include the message in the message table 279. Each entry in the message table 279 contains the message itself, the time when the message is scheduled to be sent, and the number of receptions of the same message by the node 101 (see Table 4). In exemplary embodiments, a message is not relayed over the ad-hoc mesh network if the number of times the message has been received exceeds a predefined limit. For example, a message has the initial count of 0. In this example, as a device 101 in the neighborhood is observed to transmit the message, the message count associated with the message is increased. When the maximum message count is reached, the network control module 271 removes the message from the message table 279. The transmitter of each message is also associated with an estimated relative radio distance (D) indicating whether the transmitting node is within close proximity of the device 101 (e.g., transmitting node 101 is in the "very near" relative radio distance group) or far from the device 101 (e.g., transmitting node 101 is in the "far" relative radio distance group). If the relative radio distance associated with the transmitting node indicates that the transmission of the message occurred "very near," the device 101 would not have to relay the message because it is assumed, for instance, that most of the other neighboring devices 101 have already received the same message. By taking into account the relative radio distances of neighboring nodes, the described smart flooding functionality leads to, on average, each flooding message being received for a few times by each node 101 independent of the node density. The number of times a message is received by any one node 101 affects the scalability of the network.

If the received message, however, is a unicast reply message that was addressed to the receiving node 101, the network control module 271 checks whether the destination node 101 can be found in the routing table 273 (e.g., can be found from the destination field in the reply message, or obtained from the source field of the query by the replying node). If found, the routing table entry will give the NID of the neighboring node to which the reply message will be sent in the next opportunity. If the unicast transmission is not successful, the next entry for the same DST will be used as the next try. If the received message is a unicast reply message that was not addressed to the receiving node, and no acknowledgment from the intended receiver node was heard, the node will store the message in the message table 279 for scheduled retransmission. It is noted that unicast messages or acknowledgement messages that are not addressed to the node 101 are normally received D2D radio layer 209 (see discussion of the D2D radio layer 209 below) but not by the awareness services module 111. However, under certain circumstances, the D2D radio layer 209 can provide such messages to the awareness services module 111 to schedule for retransmission. For example, if no successful unicast of the same message is observed by the time when the message is scheduled to be transmitted, the node 101 will transmit the unicast or acknowledgement message to the intended recipient found from the routing table 273 associated with the message. In this way, the nodes 101 that are not the intended recipients of the reply messages can assist in routing the message forward towards the correct destination.

TABLE 4

| Message | Time to send | Received msg count |
|---------|--------------|--------------------|
| MSG1    | t1           | C1                 |
| MSG2    | t2           | C2                 |
| ...     | ...          | ...                |
| MSGM    | tM           | CM                 |

As shown in FIG. 2A, the awareness services module 111 has connectivity to a device-to-device (D2D) radio layer 209. The D2D radio layer 209 enables the formation of the ad-hoc mesh network and sharing of awareness information using, for instance, short range radio technologies such WLAN and Bluetooth®. It is contemplated that the D2D radio layer 209 may use any wireless technology for communication between devices over short ranges. The radio technology, for instance, enables each device 101 within the ad-hoc mesh network to broadcast messages in a connectionless way to the neighboring nodes 101 that are within radio range. As used herein, the term "connectionless" means the devices 101 need not use two-way signaling to establish a communication channel before broadcasting a message. In exemplary embodiments, the D2D radio layer 209 may include multiple radios using one or more different technologies or protocols (e.g., WLAN and Bluetooth®simultaneously). A device 101 configured with multiple radios may act as a gateway node to span two or more sub-networks serviced by the different wireless technologies. In this way, messages broadcast on one sub-network may be propagated to another sub-network.

Figure 7:
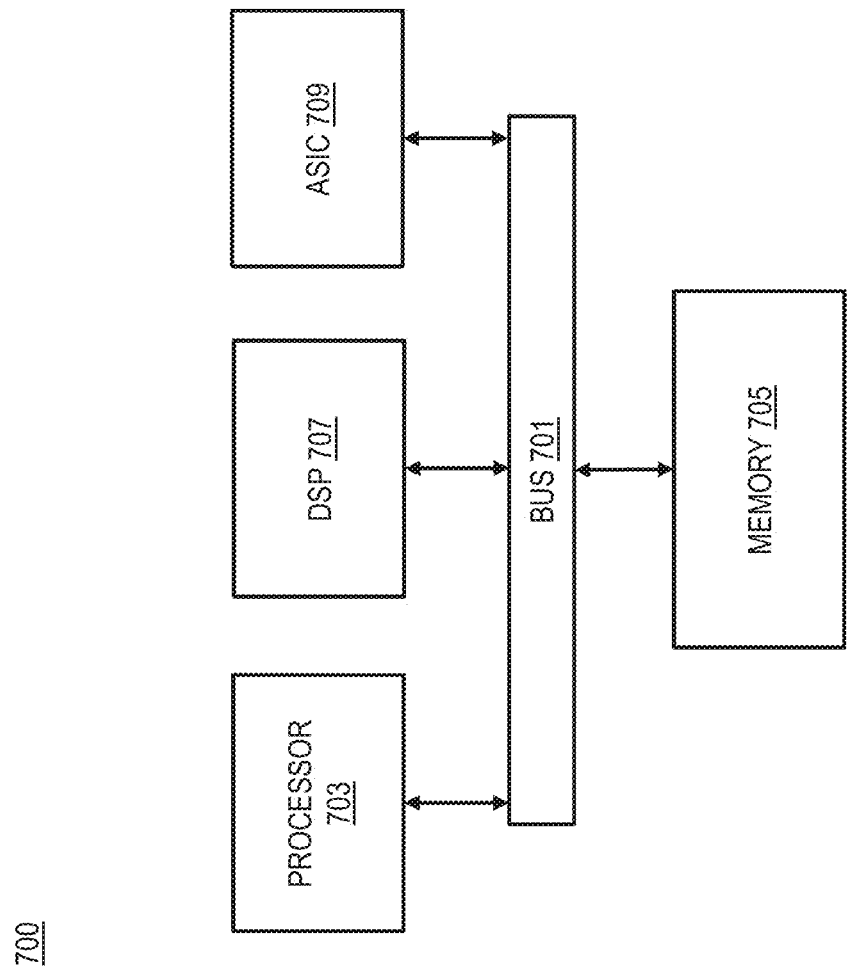
FIG. 7 is a diagram of a chip set that can be used to implement an embodiment of the invention.

FIGS. 3A-3D are flowcharts of processes for enabling a communication intended for one device to be automatically conveyed to a group of other devices within proximity of the device, according to various embodiments. In one embodiment, the notification module 107 and awareness module 111 operate to enable processes 300, 308, 312 and 318 are implemented in, for instance, a chip set including a processor and a memory as shown in FIG. 7. In step 301, at least one communication is determined to be directed to at least one device. In another step 303, one or more other devices are determined to be within a proximity of the at least one device. As noted previously, the communication is directed to a recipient device while the one or more other devices may serve as one or more remote communication nodes.

Per step 305, at least one notification of the at least one communication is caused to be transmitted to the one or more devices. As noted, the one or more devices correspond to those determined to be selected by the user of the at least one device as belonging to a common group. In step 307, a relaying, a forwarding and/or a combination thereof of the at least one communication from the at least one device to at least one of the one or more other devices is caused. The relaying, forwarding, etc., is executed based on a determination of a request to receive the at least one communication by the at least one of the one or more other devices.

In step 309 of process 308 (FIG. 3B), the notification module causes a generation of the at least one notification to include an identifier of the at least one device, a user associated with the at least one device and/or a communication account associated with the at least one device. In another step 311, the module causes a generation of the at least one notification to include a request for authentication information. As noted previously, the authentication information is provided by the at least one of the one or more devices to the relaying, the forwarding, a presentation of additional information, or a combination thereof. The additional information includes at least in part, an originator of the at least one communication, metadata associated with the at least one communication, or a combination thereof.

It is noted that the metadata may be used for supporting the conditional conveying of communications to the one or more devices. Also, of note, the authentication step of 309 may be executed optionally. In certain embodiments, the authentication step 309 may also be performed on a group or device specific basis. For example, a device may be configured to receive a call from a device of a spouse without authentication, while a call from any device in a "Judo Club" group would require authentication before conveyance is permitted.

In step 313 of process 312 (FIG. 3C), the notification module and/or awareness services module cause the relaying and/or the forwarding of the at least one communication and/or the transmission of the at least one notification via peer-to-peer networking and/or ad-hoc mesh networking. In another step 315, at least another communication directed to the least one of the one or more devices while the at least one of the one or more other devices is engaged in at least one communication. Per step 317, the notification module and/or awareness services module cause transmission of at least another notification of the at least another communication to other ones of the one or more other devices. It is noted that when the subsequent communication arrives at a wireless device already being used as a remote communication node by the recipient device, the call rings in all the other devices unused at the time (e.g., those within proximity of the recipient device).

In FIG. 3D of process 318, the awareness services module 111 determines one or more devices from among a predetermined community of devices (step 319). As noted previously, the community of devices includes those configured to interact within and/or establish among themselves a range based communication network. Hence, it is noted that one or more of the collective devices 101a-101c of the community may be further defined by respective users of said devices 101a-101c as belonging to one or more defined groups. In step 321, the notification module and/or awareness services module causes the relaying and/or forwarding of the at least one communication via a Voice over Internet Protocol session.

Per step 323, the awareness services module determines the proximity of one or more devices of the community based on a number of hops in an ad-hoc mesh network, a range of wireless communication radio, a predetermined bounded area, or a combination thereof. For example, as noted previously, the ad-hoc mesh network enables connectionless, stateless interaction between the devices. Hence, when a communication is completed (e.g., a phone call is dropped), the VoIP connection facilitated between respective wireless devices over the ad-hoc mesh network is dismantled and only the low-power communication channels are maintained between the devices of the community subject to the shared/conveyed communication. This low power state enables quick, seamless connectivity between the recipient device and the remote communication nodes for conveyance of subsequent communications.

Figure 4A:
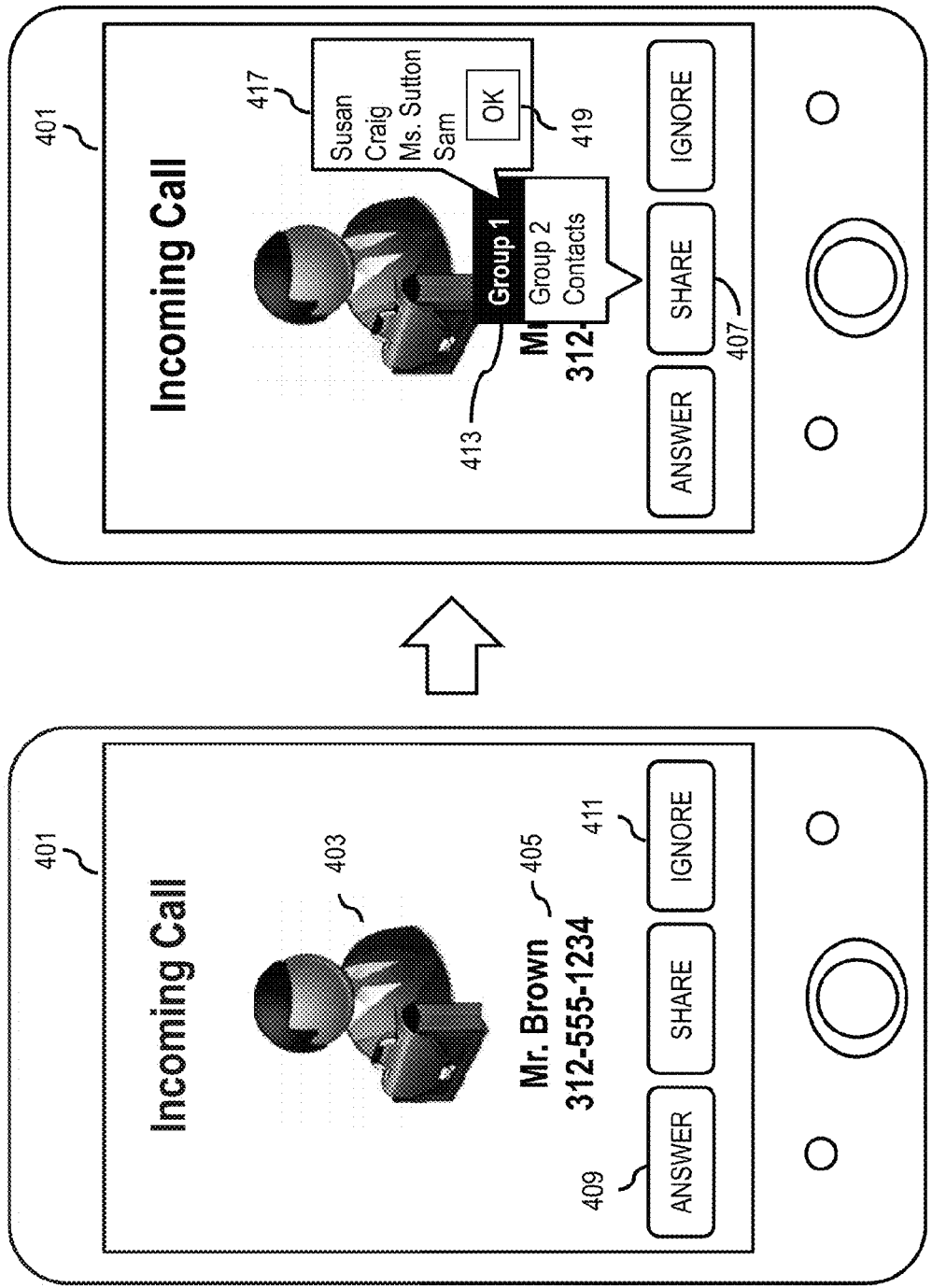
FIGS. 4A, 4B and 5A-5C are diagrams of user interfaces utilized in the processes of FIGS. 3A-3D, according to various embodiments.
Figure 4B:
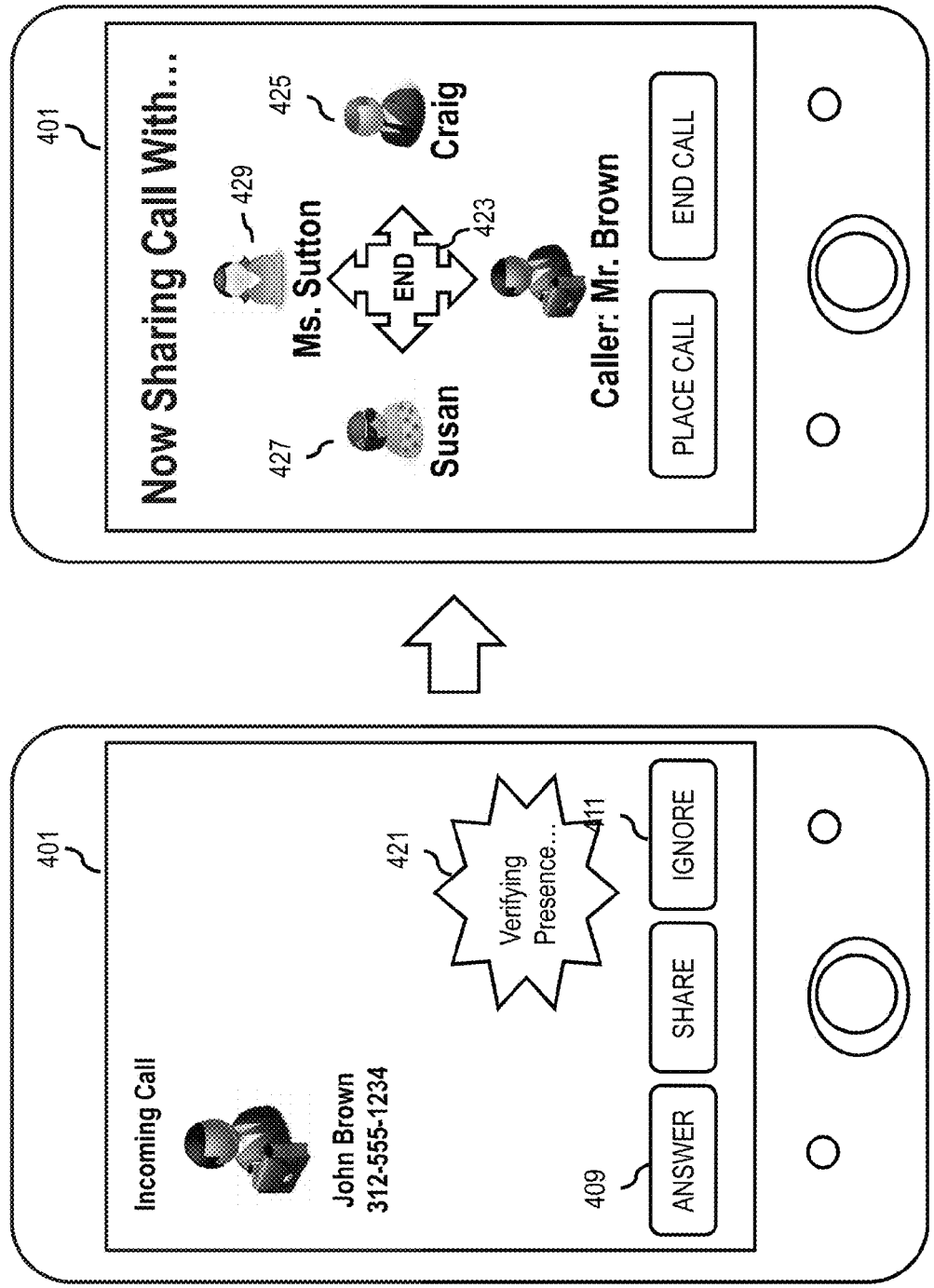

FIGS. 4A, 4B and 5A-5C are diagrams of user interfaces utilized in the processes of FIGS. 3A-3D, according to various embodiments. By way of example, FIGS. 4A and 4B depict the user interface of a recipient device, while FIGS. 5A-5C corresponds to that of a wireless communication node. Each device is configured with an awareness services module and notification module for enabling conveyance of communications via a range based communication network. For the purpose of illustration, the user interfaces are presented from the perspective of a use case of a voice/phone based communication being conveyed by the recipient device 400 to one or more remote communication nodes (e.g., a wireless device 500).

The recipient device 400 receives a call from a device user (caller) named Mr. Brown. When the call arrives, the display 401 is caused to display an avatar 403, user identifier information and a corresponding phone number 405 related to Mr. Brown. In this scenario, Mr. Brown is a known contact of the user of the recipient device 400. The user may select an ANSWER action button 409 or IGNORE action button 411 to accept the phone call or ignore it (e.g., direct the caller to voicemail) accordingly.

In response to the communication, the user activates a SHARE action button 407 to initiate a conveying/sharing of the call with one or more other devices within a community of devices configured to communicate via a range based network (e.g., ad-hoc mesh networking capable). A selection menu 413 is rendered to the interface for enabling the user to select from one or more groups of devices within the community to share, forward and/or relay the call to. When the user selects a group designated as "GROUP 1" 413, a pop-up window 417 is presented to the display 401 for indicating which users and/or devices are associated with the group. The user then selects an OK action button 419, which in turn initiates generation of a notification of the call to all the other devices within proximity of the recipient device 400. This setting can be maintained for all calls received in the future, until the configuration is changed again. Hence, once a selection is made, the user need not adapt settings even when they are in different places and environments.

It is noted that the notification message is transmitted as a single broadcast message. The broadcast message is received by any devices currently configured and active for communication within the range based communication network and corresponding to "GROUP 1" 413. Hence, awareness information is attempted to be generated for the wireless devices of the users within the group to determine their presence and proximity to the recipient device 400. During this time, the user interface 401 presents a message 421 for indicating that the proximity detection and security verification process is underway, as shown in FIG. 4B. It is noted that the user may also opt to answer the phone call at any time by selecting the ANSWER action button 409 without disrupting the authentication and/or proximity detection process. In certain embodiments, the authentication process as presented herein happens only if the user is using a different device to receive the call (e.g., an alternate device to which the user's calls may be forwarded). Thus, separate proximity detection is not required per the seamless connectivity and detection characteristics of the ad-hoc network.

Once the proximity of the devices of 'GROUP 1' is verified/detected and the authentication process is completed, the user interface 401 of device 400 presents one or more icons 425, 427 and 429 for representing the remote communication nodes to which the call can be conveyed. This display could be maintained continually during the call for indicating any devices belonging to the allowed groups that happen to be in proximity. Icons 425 are presented or removed in conjunction with the entry or exit of devices belonging to the group accordingly.

Under this scenario, the remote communication nodes correspond to the devices of the users labeled as Susan, Ms. Sutton and Craig. It is noted that the only member of 'GROUP 1' in which the call is not conveyed is Sam. This may be due to various factors, including the device of the user designated as Sam was not within physical proximity of the recipient device 400 for establishing a range based communication network connection. Alternatively, the device of the user Sam may have been within the appropriate proximity, but the request for enabling conveyance of the incoming call was ignored. Within the context of an ad-hoc mesh network, the process of determining if devices are within proximity of each other is seamless—i.e., no control signaling or connectivity alerts need be generated via an ad-hoc network. Rather, the determining is synonymous with an automated detecting/sensing of a number of hops within the network, a range of wireless communication radio, a predetermined bounded area, or a combination thereof.

Figure 5A:
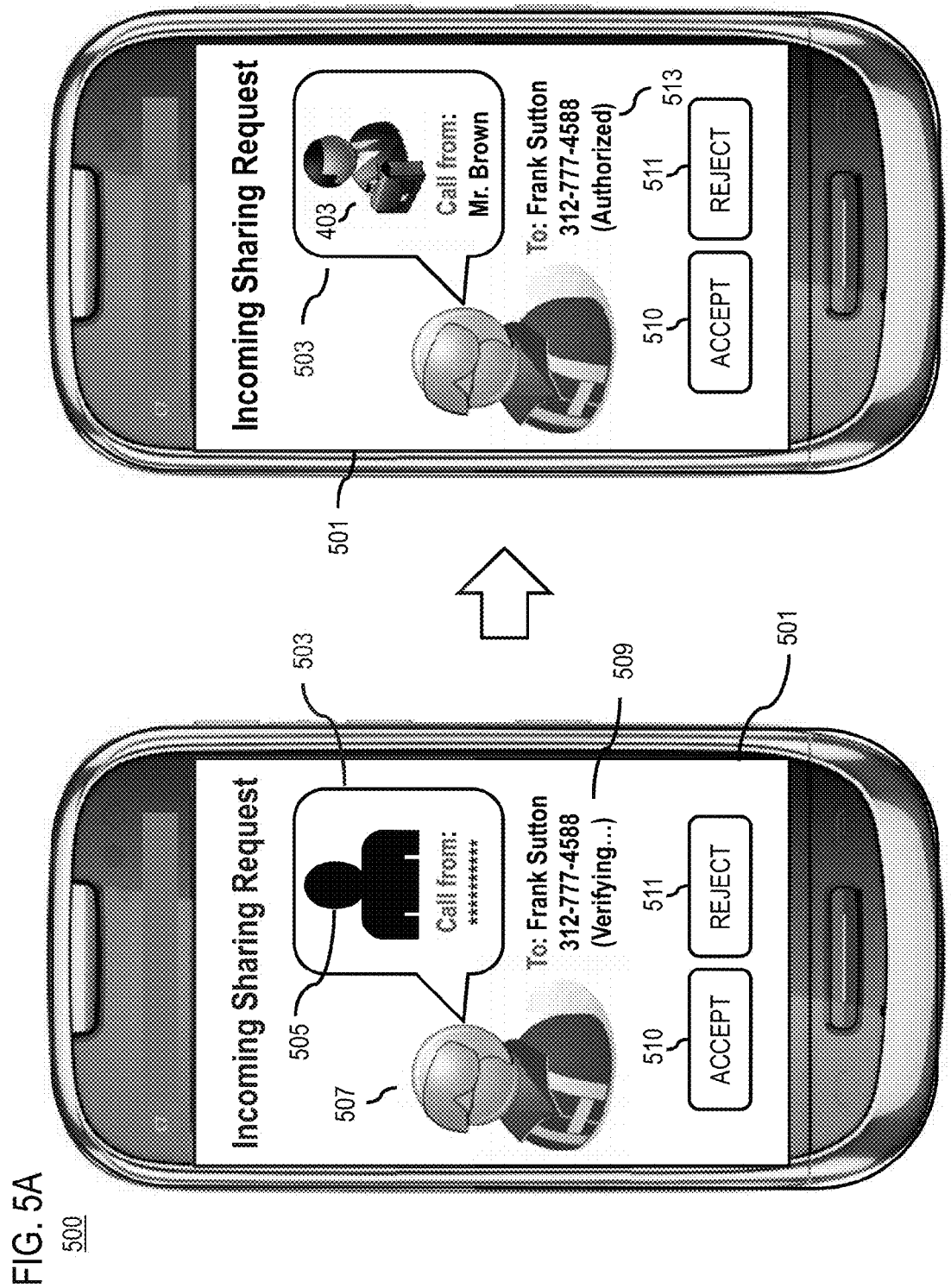

In FIG. 5A, the device 500 of one of the users designated as Craig that is within range of the recipient device 400 receives notification of the incoming call. For the purpose of illustration, device 500 is able to receive calls directed to the recipient even in the absence of their device 400. The notification is presented to the display 501 as a sharing request, and includes an icon 507 for representing an avatar of the user of the recipient device. Under this scenario, the avatar 507 is accompanied by user identifier information and a corresponding phone number 509 related to the recipient Frank Sutton. Included with the user identifier information and phone number 509 is also current authentication status information, which in this case indicates "Verifying . . . " for representing the authentication process is underway. Authentication is purposed to verify that Frank Sutton is authorized to answer the call. Authentication is optional, but in this case is required as a result of the settings made by the recipient (Frank Sutton) earlier with respect to the recipient device 400.

A prompt 503 for indicating details about the user that initiated and directed the communication to the recipient device 400 is also presented. It is noted, however, that the information is masked during the authentication process—i.e., the avatar 403 for representing the caller Mr. Brown is shown as a generic avatar 505. Only after the authentication process is completed are the actual details of the originating caller Mr. Brown presented via the prompt 503. For example, once the user of the recipient device 400 labeled Frank Sutton is authenticated, the authentication status 513 is changed to "Authorized." Resultantly, the avatar 403 as well as the name (Mr. Brown) and phone number of the incoming caller are presented via the prompt 503. It is noted that this process is only performed when authentication is required by the device conveying the call to any one of the other devices within the community.

The user labeled Craig is also presented with an ACCEPT action button 510 and REJECT action button 511. Activation of the ACCEPT action button 510 corresponds to acceptance of the incoming sharing request and hence permission for the device 500 to serve as a remote wireless node on behalf of the recipient. Activation of the REJECT action button 511 serves as a rejection of the incoming sharing request. When the recipient accepts the call, a VoIP connection between the recipient device 400 and the wireless device 500 of the user Craig for conveying the communication from Mr. Brown is activated (assuming the authentication is complete). Of note, the actual VoIP call can be established via a wireless local area network (WLAN) or WiFi direct connection between the recipient device 400 and remote wireless node 500. Under this scenario, the peer-to-peer call is routed through a WLAN access point and the necessary information for establishing call set-up is transferred over the range based communication network (e.g., ad-hoc mesh network). As a result, when the user of the recipient device 400 accepts the call from Mr. Brown, the VoIP connection as well as the cellular call is activated.

Figure 5C:
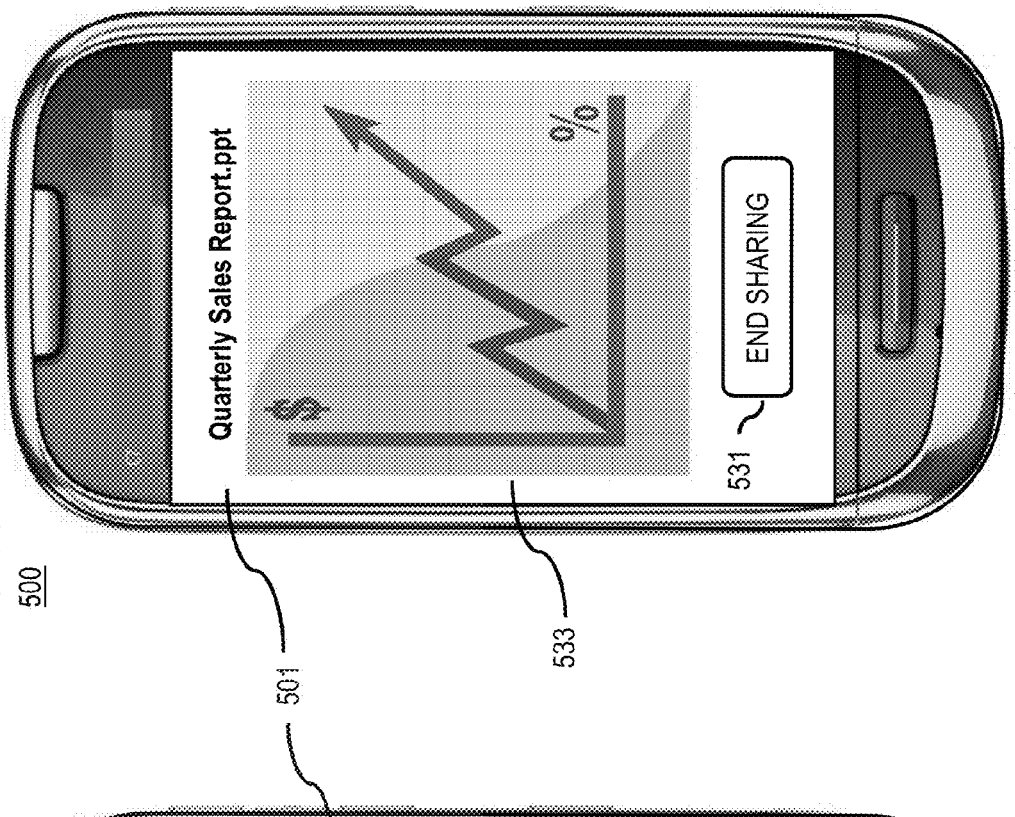
Figure 5B:
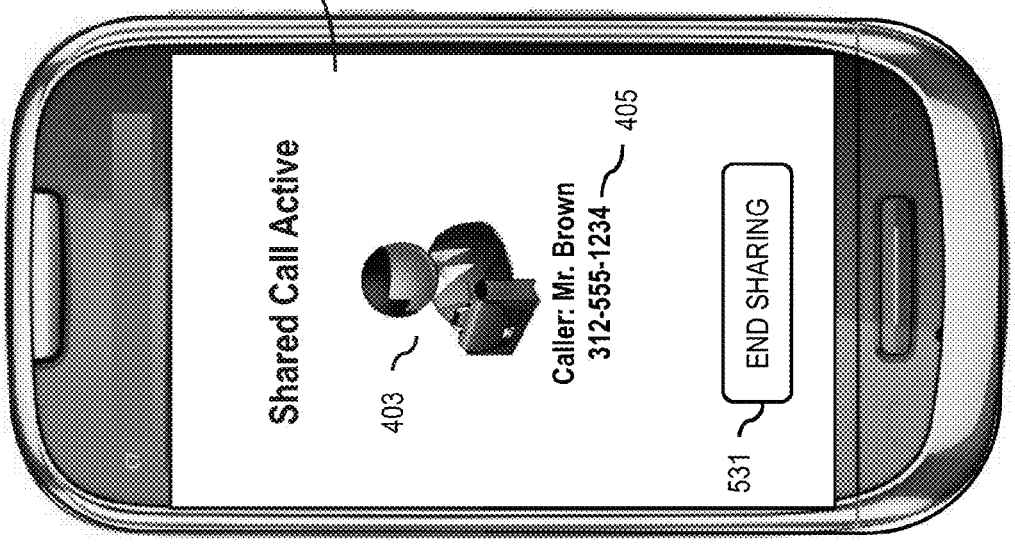

As shown in FIG. 5B, once the call is accepted, the device 500 presents the call from Mr. Brown as being actively shared. Of note, the display 501 is equivalent to that presented at the recipient device 401. Hence, the avatar 403 and name and phone number information 405 of the originating caller that initiated the communication with the recipient device 400 is presented to the now acting remote wireless node (e.g., device 500). As shown in FIG. 5C, having established a connection, any other content presented at the recipient device 400 is also presented to the display 501 of device 500. For example, in the case of a web conference or video chat session with Mr. Brown, content 533 for conveying a sales report is presented to the display 501.

An END SHARING action button 531 is also presented for selection by the user of device 500. Activation of the END SHARING action button 531 causes deactivation of the connection with the recipient device 400 for conveyance of the communication from the user designated as Mr. Brown. Resultantly, any voice, audio, video or image content related to the communication is discontinued. Also, the VoIP connection between the recipient device 400 and the remote wireless node 500 is dismantled. Only the low-power, connectionless channel as established via the range based communication network (e.g., Ad-hoc mesh network connectivity) continues between the recipient device 400 and the other devices within the community (e.g., that of the users labeled Ms. Sutton, Susan and the user of the recipient device 400). As a result of this low power connection, subsequent communications conveyed by the recipient device 400 to the shared device 500 are seamlessly and automatically shared. Furthermore, an incoming communication at the recipient devices causes a ringing, alerting, or generation of a notification prompt of the communication at device 500 as well as any of the other devices of 'GROUP 1' 413 that are still active within the community.

For the purpose of illustration, the scenario of a user sharing a call directed to them via a device that is not their own is considered with respect to FIG. 5A. By way of example, the recipient (Frank Sutton) may accept an incoming call from Mr. Brown from device 500 belonging to a user entitled Craig. The recipient can subsequently share the call as received and presently engaged with another user entitled Susan. Under this scenario, the user identifier information and a corresponding phone number 509 would indicate "From: Frank Sutton" as opposed to "To: Frank Sutton" being that the call is being directed to Susan from the alternate device 500. Also, the prompt 503 would indicate "Call from: Mr. Brown" immediately as opposed to presenting the generic avatar 505 or masking the identity of the originating caller. In this case, authentication is not necessary as the call is conveyed to Susan's own device.

The exemplary techniques and system presented herein enables a communication to be conveyed to one or more other wireless devices within proximity of a receiving device. Other wireless devices associated with the receiving device by way of a common group designation can seamlessly receive and respond to communication direct to the recipient as if the communication was solely directed to the other devices. As such, a notification message, alarm, ringer or other action triggered for execution at the wireless device due to receipt or acceptance of a communication is reciprocated by the other devices within range of the user.

The processes described herein for enabling a communication intended for a device to be automatically conveyed to a group of other devices within proximity of the device may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 6:
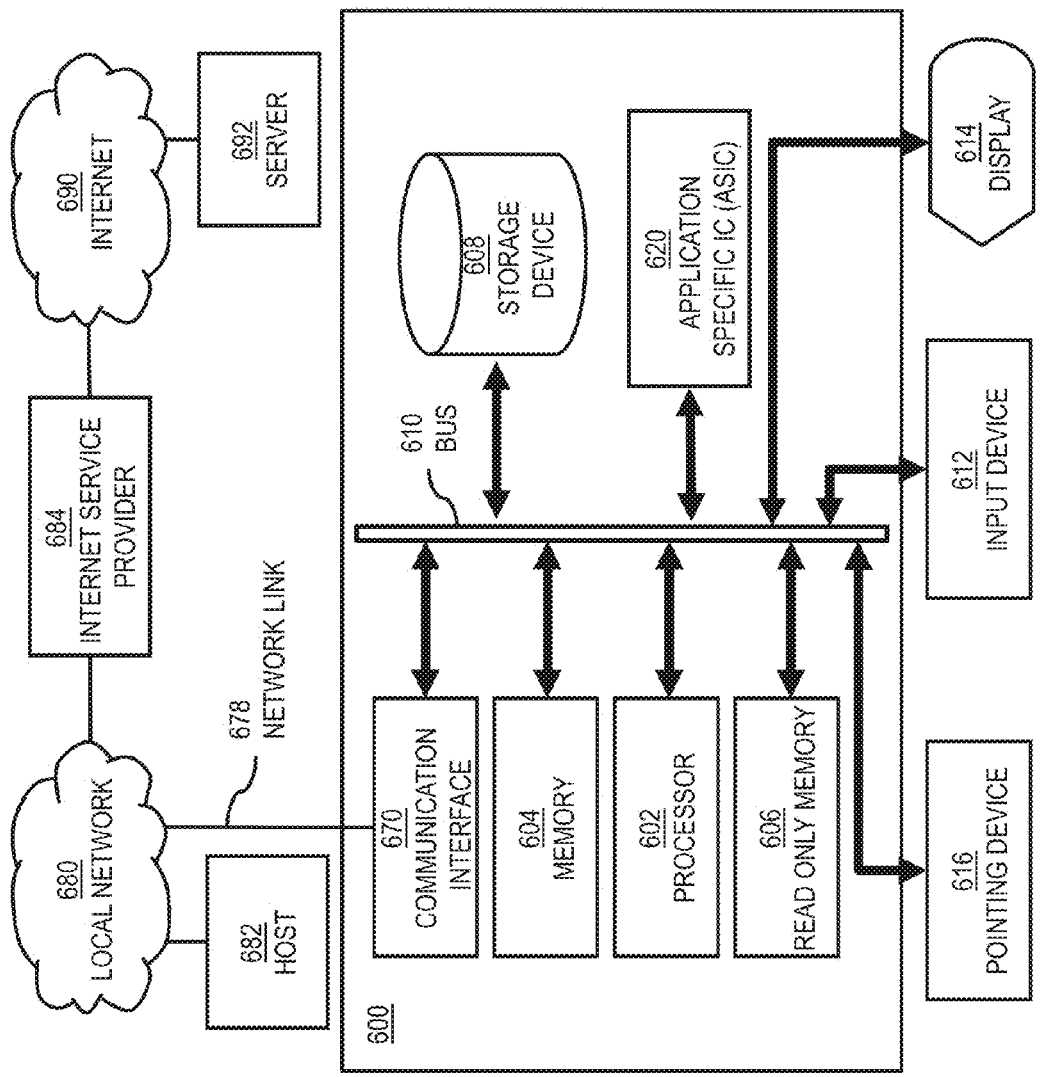
FIG. 6 is a diagram of hardware that can be used to implement an embodiment of the invention.

FIG. 6 illustrates a computer system 600 upon which an embodiment of the invention may be implemented. Although computer system 600 is depicted with respect to a particular device or equipment, it is contemplated that other devices or equipment (e.g., network elements, servers, etc.) within FIG. 6 can deploy the illustrated hardware and components of system 600. Computer system 600 is programmed (e.g., via computer program code or instructions) to enable a communication intended for a device to be automatically conveyed to a group of other devices within proximity of the device as described herein and includes a communication mechanism such as a bus 610 for passing information between other internal and external components of the computer system 600. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 600, or a portion thereof, constitutes a means for performing one or more steps of enabling a communication intended for a device to be automatically conveyed to a group of other devices within proximity of the device.

A bus 610 includes one or more parallel conductors of information so that information is transferred quickly among devices coupled to the bus 610. One or more processors 602 for processing information are coupled with the bus 610.

A processor (or multiple processors) 602 performs a set of operations on information as specified by computer program code related to enable a communication intended for a device to be automatically conveyed to a group of other devices within proximity of the device. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 610 and placing information on the bus 610. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 602, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 600 also includes a memory 604 coupled to bus 610. The memory 604, such as a random access memory (RAM) or any other dynamic storage device, stores information including processor instructions for enabling a communication intended for a device to be automatically conveyed to a group of other devices within proximity of the device. Dynamic memory allows information stored therein to be changed by the computer system 600. RAM allows a unit of information stored at a location called a memory address to be stored and retrieved independently of information at neighboring addresses. The memory 604 is also used by the processor 602 to store temporary values during execution of processor instructions. The computer system 600 also includes a read only memory (ROM) 606 or any other static storage device coupled to the bus 610 for storing static information, including instructions, that is not changed by the computer system 600. Some memory is composed of volatile storage that loses the information stored thereon when power is lost. Also coupled to bus 610 is a non-volatile (persistent) storage device 608, such as a magnetic disk, optical disk or flash card, for storing information, including instructions, that persists even when the computer system 600 is turned off or otherwise loses power.

Information, including instructions for enabling a communication intended for a device to be automatically conveyed to a group of other devices within proximity of the device, is provided to the bus 610 for use by the processor from an external input device 612, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 600. Other external devices coupled to bus 610, used primarily for interacting with humans, include a display device 614, such as a cathode ray tube (CRT), a liquid crystal display (LCD), a light emitting diode (LED) display, an organic LED (OLED) display, a plasma screen, or a printer for presenting text or images, and a pointing device 616, such as a mouse, a trackball, cursor direction keys, or a motion sensor, for controlling a position of a small cursor image presented on the display 614 and issuing commands associated with graphical elements presented on the display 614. In some embodiments, for example, in embodiments in which the computer system 600 performs all functions automatically without human input, one or more of external input device 612, display device 614 and pointing device 616 is omitted.

In the illustrated embodiment, special purpose hardware, such as an application specific integrated circuit (ASIC) 620, is coupled to bus 610. The special purpose hardware is configured to perform operations not performed by processor 602 quickly enough for special purposes. Examples of ASICs include graphics accelerator cards for generating images for display 614, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 600 also includes one or more instances of a communications interface 670 coupled to bus 610. Communication interface 670 provides a one-way or two-way communication coupling to a variety of external devices that operate with their own processors, such as printers, scanners and external disks. In general the coupling is with a network link 678 that is connected to a local network 680 to which a variety of external devices with their own processors are connected. For example, communication interface 670 may be a parallel port or a serial port or a universal serial bus (USB) port on a personal computer. In some embodiments, communications interface 670 is an integrated services digital network (ISDN) card or a digital subscriber line (DSL) card or a telephone modem that provides an information communication connection to a corresponding type of telephone line. In some embodiments, a communication interface 670 is a cable modem that converts signals on bus 610 into signals for a communication connection over a coaxial cable or into optical signals for a communication connection over a fiber optic cable. As another example, communications interface 670 may be a local area network (LAN) card to provide a data communication connection to a compatible LAN, such as Ethernet. Wireless links may also be implemented. For wireless links, the communications interface 670 sends or receives or both sends and receives electrical, acoustic or electromagnetic signals, including infrared and optical signals, that carry information streams, such as digital data. For example, in wireless handheld devices, such as mobile telephones like cell phones, the communications interface 670 includes a radio band electromagnetic transmitter and receiver called a radio transceiver. In certain embodiments, the communications interface 670 enables connection to the communication network 105 for enabling a communication intended for a device to be automatically conveyed to a group of other devices within proximity of the device to the UE 101.

The term "computer-readable medium" as used herein refers to any medium that participates in providing information to processor 602, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 608. Volatile media include, for example, dynamic memory 604. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 620.

Network link 678 typically provides information communication using transmission media through one or more networks to other devices that use or process the information. For example, network link 678 may provide a connection through local network 680 to a host computer 682 or to equipment 684 operated by an Internet Service Provider (ISP). ISP equipment 684 in turn provides data communication services through the public, world-wide packet-switching communication network of networks now commonly referred to as the Internet 690.

A computer called a server host 692 connected to the Internet hosts a process that provides a service in response to information received over the Internet. For example, server host 692 hosts a process that provides information representing video data for presentation at display 614. It is contemplated that the components of system 600 can be deployed in various configurations within other computer systems, e.g., host 682 and server 692.

At least some embodiments of the invention are related to the use of computer system 600 for implementing some or all of the techniques described herein. According to one embodiment of the invention, those techniques are performed by computer system 600 in response to processor 602 executing one or more sequences of one or more processor instructions contained in memory 604. Such instructions, also called computer instructions, software and program code, may be read into memory 604 from another computer-readable medium such as storage device 608 or network link 678. Execution of the sequences of instructions contained in memory 604 causes processor 602 to perform one or more of the method steps described herein. In alternative embodiments, hardware, such as ASIC 620, may be used in place of or in combination with software to implement the invention. Thus, embodiments of the invention are not limited to any specific combination of hardware and software, unless otherwise explicitly stated herein.

The signals transmitted over network link 678 and other networks through communications interface 670, carry information to and from computer system 600. Computer system 600 can send and receive information, including program code, through the networks 680, 690 among others, through network link 678 and communications interface 670. In an example using the Internet 690, a server host 692 transmits program code for a particular application, requested by a message sent from computer 600, through Internet 690, ISP equipment 684, local network 680 and communications interface 670. The received code may be executed by processor 602 as it is received, or may be stored in memory 604 or in storage device 608 or any other non-volatile storage for later execution, or both. In this manner, computer system 600 may obtain application program code in the form of signals on a carrier wave.

Various forms of computer readable media may be involved in carrying one or more sequence of instructions or data or both to processor 602 for execution. For example, instructions and data may initially be carried on a magnetic disk of a remote computer such as host 682. The remote computer loads the instructions and data into its dynamic memory and sends the instructions and data over a telephone line using a modem. A modem local to the computer system 600 receives the instructions and data on a telephone line and uses an infra-red transmitter to convert the instructions and data to a signal on an infra-red carrier wave serving as the network link 678. An infrared detector serving as communications interface 670 receives the instructions and data carried in the infrared signal and places information representing the instructions and data onto bus 610. Bus 610 carries the information to memory 604 from which processor 602 retrieves and executes the instructions using some of the data sent with the instructions. The instructions and data received in memory 604 may optionally be stored on storage device 608, either before or after execution by the processor 602.

FIG. 7 illustrates a chip set or chip 700 upon which an embodiment of the invention may be implemented. Chip set 700 is programmed to enable a communication intended for a device to be automatically conveyed to a group of other devices within proximity of the device as described herein and includes, for instance, the processor and memory components described with respect to FIG. 6 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 700 can be implemented in a single chip. It is further contemplated that in certain embodiments the chip set or chip 700 can be implemented as a single "system on a chip." It is further contemplated that in certain embodiments a separate ASIC would not be used, for example, and that all relevant functions as disclosed herein would be performed by a processor or processors. Chip set or chip 700, or a portion thereof, constitutes a means for performing one or more steps of providing user interface navigation information associated with the availability of functions. Chip set or chip 700, or a portion thereof, constitutes a means for performing one or more steps of enabling a communication intended for a device to be automatically conveyed to a group of other devices within proximity of the device.

In one embodiment, the chip set or chip 700 includes a communication mechanism such as a bus 701 for passing information among the components of the chip set 700. A processor 703 has connectivity to the bus 701 to execute instructions and process information stored in, for example, a memory 705. The processor 703 may include one or more processing cores with each core configured to perform independently. A multi-core processor enables multiprocessing within a single physical package. Examples of a multi-core processor include two, four, eight, or greater numbers of processing cores. Alternatively or in addition, the processor 703 may include one or more microprocessors configured in tandem via the bus 701 to enable independent execution of instructions, pipelining, and multithreading. The processor 703 may also be accompanied with one or more specialized components to perform certain processing functions and tasks such as one or more digital signal processors (DSP) 707, or one or more application-specific integrated circuits (ASIC) 709. A DSP 707 typically is configured to process real-world signals (e.g., sound) in real time independently of the processor 703. Similarly, an ASIC 709 can be configured to performed specialized functions not easily performed by a more general purpose processor. Other specialized components to aid in performing the inventive functions described herein may include one or more field programmable gate arrays (FPGA), one or more controllers, or one or more other specialpurpose computer chips.

In one embodiment, the chip set or chip 700 includes merely one or more processors and some software and/or firmware supporting and/or relating to and/or for the one or more processors.

The processor 703 and accompanying components have connectivity to the memory 705 via the bus 701. The memory 705 includes both dynamic memory (e.g., RAM, magnetic disk, writable optical disk, etc.) and static memory (e.g., ROM, CD-ROM, etc.) for storing executable instructions that when executed perform the inventive steps described herein to enable a communication intended for a device to be automatically conveyed to a group of other devices within proximity of the device. The memory 705 also stores the data associated with or generated by the execution of the inventive steps.

Figure 8:
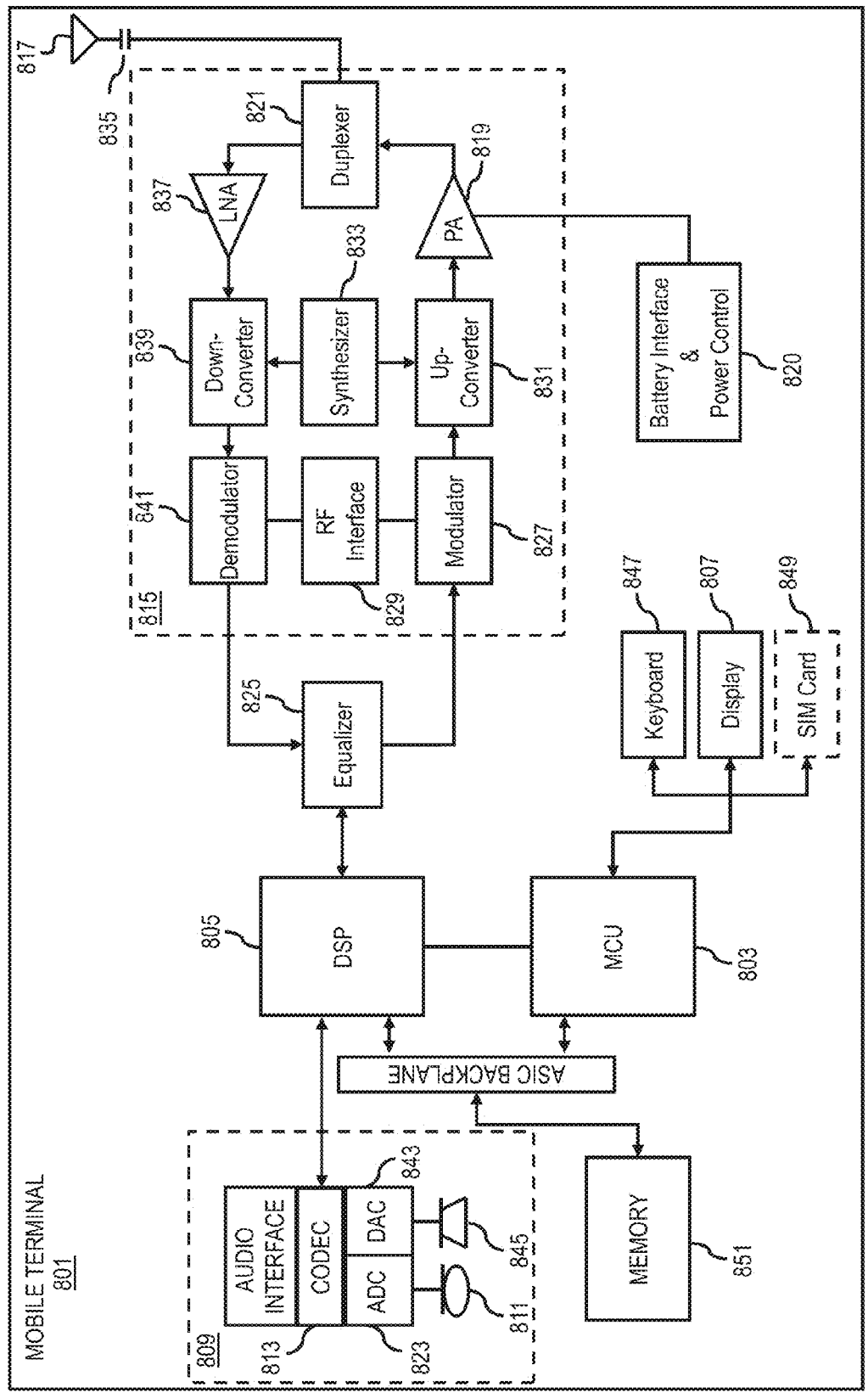
FIG. 8 is a diagram of a mobile terminal (e.g., handset) that can be used to implement an embodiment of the invention.

FIG. 8 is a diagram of exemplary components of a mobile terminal (e.g., handset) for communications, which is capable of operating in the system of FIG. 1, according to one embodiment. In some embodiments, mobile terminal 801, or a portion thereof, constitutes a means for performing one or more steps of enabling a communication intended for a device to be automatically conveyed to a group of other devices within proximity of the device. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 803, a Digital Signal Processor (DSP) 805, and a receiver/transmitter unit including a microphone gain control unit and a speaker gain control unit. A main display unit 807 provides a display to the user in support of various applications and mobile terminal functions that perform or support the steps of enabling a communication intended for a device to be automatically conveyed to a group of other devices within proximity of the device. The display 807 includes display circuitry configured to display at least a portion of a user interface of the mobile terminal (e.g., mobile telephone). Additionally, the display 807 and display circuitry are configured to facilitate user control of at least some functions of the mobile terminal. An audio function circuitry 809 includes a microphone 811 and microphone amplifier that amplifies the speech signal output from the microphone 811. The amplified speech signal output from the microphone 811 is fed to a coder/decoder (CODEC) 813.

A radio section 815 amplifies power and converts frequency in order to communicate with a base station, which is included in a mobile communication system, via antenna 817. The power amplifier (PA) 819 and the transmitter/modulation circuitry are operationally responsive to the MCU 803, with an output from the PA 819 coupled to the duplexer 821 or circulator or antenna switch, as known in the art. The PA 819 also couples to a battery interface and power control unit 820.

In use, a user of mobile terminal 801 speaks into the microphone 811 and his or her voice along with any detected background noise is converted into an analog voltage. The analog voltage is then converted into a digital signal through the Analog to Digital Converter (ADC) 823. The control unit 803 routes the digital signal into the DSP 805 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 825 for compensation of any frequency-dependent impairments that occur during transmission though the air such as phase and amplitude distortion. After equalizing the bit stream, the modulator 827 combines the signal with a RF signal generated in the RF interface 829. The modulator 827 generates a sine wave by way of frequency or phase modulation. In order to prepare the signal for transmission, an up-converter 831 combines the sine wave output from the modulator 827 with another sine wave generated by a synthesizer 833 to achieve the desired frequency of transmission. The signal is then sent through a PA 819 to increase the signal to an appropriate power level. In practical systems, the PA 819 acts as a variable gain amplifier whose gain is controlled by the DSP 805 from information received from a network base station. The signal is then filtered within the duplexer 821 and optionally sent to an antenna coupler 835 to match impedances to provide maximum power transfer. Finally, the signal is transmitted via antenna 817 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 801 are received via antenna 817 and immediately amplified by a low noise amplifier (LNA) 837. A down-converter 839 lowers the carrier frequency while the demodulator 841 strips away the RF leaving only a digital bit stream. The signal then goes through the equalizer 825 and is processed by the DSP 805. A Digital to Analog Converter (DAC) 843 converts the signal and the resulting output is transmitted to the user through the speaker 845, all under control of a Main Control Unit (MCU) 803 which can be implemented as a Central Processing Unit (CPU).

The MCU 803 receives various signals including input signals from the keyboard 847. The keyboard 847 and/or the MCU 803 in combination with other user input components (e.g., the microphone 811) comprise a user interface circuitry for managing user input. The MCU 803 runs a user interface software to facilitate user control of at least some functions of the mobile terminal 801 to enable a communication intended for a device to be automatically conveyed to a group of other devices within proximity of the device. The MCU 803 also delivers a display command and a switch command to the display 807 and to the speech output switching controller, respectively. Further, the MCU 803 exchanges information with the DSP 805 and can access an optionally incorporated SIM card 849 and a memory 851. In addition, the MCU 803 executes various control functions required of the terminal. The DSP 805 may, depending upon the implementation, perform any of a variety of conventional digital processing functions on the voice signals. Additionally, DSP 805 determines the background noise level of the local environment from the signals detected by microphone 811 and sets the gain of microphone 811 to a level selected to compensate for the natural tendency of the user of the mobile terminal 801.

The CODEC 813 includes the ADC 823 and DAC 843. The memory 851 stores various data including call incoming tone data and is capable of storing other data including music data received via, e.g., the global Internet. The software module could reside in RAM memory, flash memory, registers, or any other form of writable storage medium known in the art. The memory device 851 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 849 carries, for instance, important information, such as the cellular phone number, the carrier supplying service, subscription details, and security information. The SIM card 849 serves primarily to identify the mobile terminal 801 on a radio network. The card 849 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. An apparatus comprising:
   at least one processor; and
   at least one memory including computer program code for one or more programs,
   the at least one memory and the computer program code configured to, with the at least one processor, cause the apparatus to perform at least the following,
   determine at least one communication directed to at least one device;
   determine one or more other devices within a proximity of the at least one device;
   cause, at least in part, a transmission of at least one notification of the at least one communication to the one or more other devices; and
   cause, at least in part, a relaying, a forwarding, or a combination thereof of the at least one communication from the at least one device to at least one of the one or more other devices based, at least in part, on a determination of a request to receive the at least one communication by the at least one of the one or more other devices,
   wherein one or more conditions for the relaying, forwarding, or combination thereof of the at least one communication is/are established by a user of the at least one device, and
   wherein the one or more conditions comprise one or more of call characteristics, timing requirements, location information, and priority settings.

2. An apparatus of claim 1, wherein the apparatus is further caused to:
   cause, at least in part, a generation of the at least one notification to include an identifier of the at least one device, a user associated with the at least one device, a communication account associated with the at least one device, or a combination thereof.

3. An apparatus of claim 1, wherein the apparatus is further caused to:
   cause, at least in part, a generation of the at least one notification to include a request for authentication information,
   wherein the authentication information is provided by the at least one of the one or more other devices to cause, at least in part, an initiation of (a) the relaying, the forwarding, or a combination thereof of the at least one communication; (b) a presentation of additional information; or (c) a combination thereof.

4. An apparatus of claim 3, wherein the additional information includes at least in part, an originator of the at least one communication, metadata associated with the at least one communication, or a combination thereof.

5. An apparatus of claim 1, wherein the apparatus is further caused to:
   cause, at least in part, (a) the relaying, the forwarding, or a combination thereof of the at least one communication, (b) the transmission of the at least one notification, or (c) a combination thereof via peer-to-peer networking, ad-hoc mesh networking, or a combination thereof.

6. An apparatus of claim 1, wherein the apparatus is further caused to:
   determine at least another communication directed to the least one of the one or more other devices while the at least one of the one or more other devices is engaged in at least one communication; and
   cause, at least in part, a transmission of at least another notification of the at least another communication to other ones of the one or more other devices.

7. An apparatus of claim 1, wherein the at least one communication is a voice call, the method further comprising:
   cause, at least in part, the relaying, the forwarding, or a combination thereof of the at least one communication via a Voice Over Internet Protocol session.

8. An apparatus of claim 1, wherein the apparatus is further caused to:
   determine the proximity based, at least in part, on a number of hops in an ad-hoc mesh network, a range of wireless communication radio, a predetermined bounded area, or a combination thereof.

9. An apparatus of claim 1, wherein the at least one communication include, at least in part, a voice call, a video call, a messaging session, a multimedia session, a data feed, or a combination thereof.

10. A method comprising:
    determining at least one communication directed to at least one device;
    determining one or more other devices within a proximity of the at least one device;

causing, at least in part, a transmission of at least one notification of the at least one communication to the one or more other devices; and causing, at least in part, a relaying, a forwarding, or a combination thereof of the at least one communication from the at least one device to at least one of the one or more other devices based, at least in part, on a determination of a request to receive the at least one communication by the at least one of the one or more other devices, wherein one or more conditions for the relaying, forwarding, or combination thereof of the at least one communication is/are established by a user of the at least one device, and wherein the one or more conditions comprise one or more of call characteristics, timing requirements, location information, and priority settings.

11. A method of claim 10, further comprising:
causing, at least in part, a generation of the at least one notification to include an identifier of the at least one device, a user associated with the at least one device, a communication account associated with the at least one device, or a combination thereof.

12. A method of claim 10, further comprising:
causing, at least in part, a generation of the at least one notification to include a request for authentication information, wherein the authentication information is provided by the at least one of the one or more other devices to cause, at least in part, an initiation of (a) the relaying, the forwarding, or a combination thereof of the at least one communication; (b) a presentation of additional information; or (c) a combination thereof.

13. A method of claim 12, wherein the additional information includes at least in part, an originator of the at least one communication, metadata associated with the at least one communication, or a combination thereof.

14. A method of claim 10, further comprising:
causing, at least in part, (a) the relaying, the forwarding, or a combination thereof of the at least one communication, (b) the transmission of the at least one notification, or (c) a combination thereof via peer-to-peer networking, ad-hoc mesh networking, or a combination thereof.

15. A method of claim 10, further comprising:
determining at least another communication directed to the least one of the one or more other devices while the at least one of the one or more other devices is engaged in at least one communication; and causing, at least in part, a transmission of at least another notification of the at least another communication to other ones of the one or more other devices.

16. A method of claim 10, further comprising:
causing, at least in part, the relaying, the forwarding, or a combination thereof of the at least one communication via a Voice Over Internet Protocol session.

17. A method of claim 10, further comprising:
determining the proximity based, at least in part, on a number of hops in an ad-hoc mesh network, a range of wireless communication radio, a predetermined bounded area, or a combination thereof.

18. A method of claim 10, wherein the at least one communication include, at least in part, a voice call, a video call, a messaging session, a multimedia session, a data feed, or a combination thereof.

19. A computer program product including one or more sequences of one or more instructions which, when executed by one or more processors, cause an apparatus to at least perform the steps of:
determining at least one communication directed to at least one device;

determining one or more other devices within a proximity of the at least one device;

causing, at least in part, a transmission of at least one notification of the at least one communication to the one or more other devices; and causing, at least in part, a relaying, a forwarding, or a combination thereof of the at least one communication from the at least one device to at least one of the one or more other devices based, at least in part, on a determination of a request to receive the at least one communication by the at least one of the one or more other devices, wherein one or more conditions for the relaying, forwarding, or combination thereof of the at least one communication is/are established by a user of the at least one device, and wherein the one or more conditions comprise one or more of call characteristics, timing requirements, location information, and priority settings.

20. A computer program product of claim 19, further comprising:
causing, at least in part, a generation of the at least one notification to include an identifier of the at least one device, a user associated with the at least one device, a communication account associated with the at least one device, or a combination thereof.

* * * * *